US011438262B2

(12) United States Patent
Malin

(10) Patent No.: US 11,438,262 B2
(45) Date of Patent: Sep. 6, 2022

(54) SYSTEMS AND METHODS FOR TRIAGING AND ROUTING OF EMERGENCY SERVICES COMMUNICATIONS SESSIONS

(71) Applicant: Good Egg Media LLC, Northbrook, IL (US)

(72) Inventor: Jay I. Malin, Northbrook, IL (US)

(73) Assignee: Good Egg Media LLC, Northbrook, IL (US)

( * ) Notice: Subject to any disclaimer, the term of this patent is extended or adjusted under 35 U.S.C. 154(b) by 260 days.

(21) Appl. No.: 16/446,317

(22) Filed: Jun. 19, 2019

(65) Prior Publication Data
US 2019/0386917 A1    Dec. 19, 2019

Related U.S. Application Data

(60) Provisional application No. 62/686,706, filed on Jun. 19, 2018.

(51) Int. Cl.
| | |
|---|---|
| *H04L 45/00* | (2022.01) |
| *H04L 69/329* | (2022.01) |
| *H04L 67/02* | (2022.01) |
| *H04L 9/40* | (2022.01) |

(52) U.S. Cl.
CPC .............. *H04L 45/56* (2013.01); *H04L 29/06* (2013.01); *H04L 67/02* (2013.01); *H04L 69/329* (2013.01)

(58) Field of Classification Search
CPC ......... H04L 45/56; H04L 29/06; H04L 67/02; H04L 69/329
See application file for complete search history.

(56) References Cited

U.S. PATENT DOCUMENTS

| | | | |
|---|---|---|---|
| 2014/0179260 A1* | 6/2014 | Malin .................. | H04W 4/029 455/404.2 |
| 2019/0253861 A1* | 8/2019 | Horelik ................ | H04W 4/029 |

OTHER PUBLICATIONS

National Emergency Number Association (NENA)—An Overview of Policy Rules for Call Routing and Handling in NG9-1-1 (NENA 71-502, Version 1, Aug. 24, 2010); downloaded from Internet on Jun. 6, 2019, from <URL> https://www.nena.org/resource/resmgr/Standards/NENA_71-502_Policy_Rules_08-.pdf.
Emergent Communications—Emergency Services Routing Proxy (ESRP); downloaded from Internet on Jun. 19, 2019, from <URL> www.emergentcomm.com/emergency-services-routing-proxy.php.

* cited by examiner

*Primary Examiner* — Eric Myers
(74) *Attorney, Agent, or Firm* — Leydig, Voit & Mayer, Ltd.

(57) ABSTRACT

Systems, methods and software for routing of communications sessions with a contact center are disclosed. Messages requesting service that are received by the contact center from devices such as mobile phones are parsed to extract data that is pertinent to coordinating or providing the requested service. In response to the received first message containing such pertinent data, a policy is applied to the first message for routing the associated service request to a service provider based upon the content of the extracted data. In accordance with the applied policy, a second message that includes at least a portion of the pertinent data extracted from the first message is transmitted to the service provider. Embodiments of the disclosure facilitate efficient utilization of scarce personnel and computing resources of both contact centers and service providers to increase the effectiveness of their service coordination and provision.

20 Claims, 11 Drawing Sheets

SYSTEMS AND METHODS FOR TRIAGING AND ROUTING OF EMERGENCY SERVICES COMMUNICATIONS SESSIONS

CROSS REFERENCE TO RELATED APPLICATIONS

This application claims benefit of U.S. provisional patent application Ser. No. 62/686,706, filed on Jun. 19, 2018, which is hereby incorporated by reference in its entirety.

BACKGROUND

In case of an emergency, a user dials or submits a message to a designated number such as 9-1-1. Upon receipt of the message, the 9-1-1 system determines the location and routes the request for emergency service to the 9-1-1 center or public safety answering point (PSAP) associated with the requesting user's location. The call is generally put in a queue and waits for the next available call taker and/or dispatcher in the 9-1-1 center.

In the event a major event occurs, whether a natural disaster or manmade tragedy, calls for service flood the 9-1-1 center and need to wait in queue, regardless of urgency. A critical call unassociated with the incident may wait in queue while call takers answer calls in the order in which they are received. An example is a traffic accident that solicits numerous calls reporting the incident while a crosstown call about a heart attack waits. Wide-scale emergencies such as may be caused by flooding and inclement weather overload emergency dispatch centers with calls and texts.

Accordingly, there remains a need in the art for improved systems and methods for handling communication sessions between users requesting emergency services and PSAPs and contact centers in general.

SUMMARY

Systems, methods and software for routing of communications sessions with a contact center are disclosed. Messages requesting service that are received by the contact center from devices such as mobile phones are parsed to extract data that is pertinent to coordinating or providing the requested service. In response to the received first message containing such pertinent data, a policy is applied to the first message for routing the associated service request to a service provider based upon the content of the extracted data. In accordance with the applied policy, a second message that includes at least a portion of the pertinent data extracted from the first message is transmitted to the service provider. Embodiments of the disclosure facilitate efficient utilization of scarce personnel and computing resources of both contact centers and service providers to increase the effectiveness of their service coordination and provision.

One embodiment provides a computer-implemented method for routing of communications sessions with a contact center. The method includes: receiving a first message from a user equipment, where the first message is received via a first communication protocol; parsing content of the first message to extract data contained therein pertinent to service coordination or provision by the contact center; in response to the first message containing pertinent data, applying a policy for routing the first message to a service provider based on a content of the extracted data; and transmitting a second message to the service provider according to the applied policy, where the second message is transmitted via a second communications protocol, and where the second message includes at least a portion of the pertinent data extracted from the first message.

Another embodiment provides a system for routing of communications sessions with a contact center. The system includes: one or more memories storing computer-executable instructions; and one or more processors in communication with the one or more memories. The one or more processors are configured to execute the instructions in order to: receive a first message from a UE, where the first message is received via a first communications protocol; parse content of the first message to extract data contained therein pertinent to service coordination or provision by the contact center; in response to the first message containing pertinent data, apply a policy for routing the first message to a service provider based on a content of the extracted data; and transmit a second message to the service provider according to the applied policy, where the second message is transmitted via a second communications protocol, and where the second message includes at least a portion of the pertinent data extracted from the first message.

Still another embodiment provides a non-transient, computer-readable storage medium having stored therein program instructions for routing of communications sessions with a contact center, which, when executed by one or more processors, cause the one or more processors to: receive a first message from a UE, where the first message is received via a first communications protocol; parse content of the first message to extract data contained therein pertinent to service coordination or provision by the contact center; in response to the first message containing pertinent data, apply a policy for routing the first message to a service provider based on a content of the extracted data; and transmit a second message to the service provider according to the applied policy, where the second message is transmitted via a second communications protocol, and where the second message includes at least a portion of the pertinent data extracted from the first message.

DETAILED DESCRIPTION

Due, at least in part, to initiatives by the Federal Communications Commission (FCC), current public emergency communications services standards are beginning to address text and multimedia messages. Today, with so many intelligent next-generation communications technologies and the promise of AI, triage should be performed on the queue of emergency requests to determine prioritization and proper routing to service-providing agencies.

The below-described systems and methods for triaging and routing of emergency services communications sessions leverage intelligent routing policies. These policies extend to multilingual natural language processing (NLP) of incoming messages, AI filtering applied to multimedia, and location-based policies that use incident intensity as a basis for message routing. Processing of requests for emergency or other services use intelligent routing according to efficient workflows, such as: (a) custom autoreply (bounce back) to the requesting user indicating their request is being specially routed; (b) custom automated collection or decision tree that collects information to perform special routing and forwarding collected information to the recipient agency and/or other service provider; and (c) routing to a specialized personnel position or to a special-purpose queue assigned for a particular incident.

Many requests for service can be similarly answered with common information such as contact information and instructions. Others may be directly routed to the correct agencies based upon simple information. Text requests are readily triaged using information provided within the first message and may be displayed on a single screen page for a dispatcher to immediately review. This functionality is applicable to all forms of text such as SMS, Messenger, social, and chat.

There is no limitation on communication channels support by the disclosed systems and methods for triaging and routing of emergency services communications sessions. Examples include, without limitation, SMS, next-generation IP telephony (e.g., session initiation protocol, SIP), instant messaging, Rich Communications Suite (RCS), WhatsApp, Apple Business Chat, and Facebook Messenger. The combination of NLP, intelligent, configurable routing, and two-way interactivity allows citizens to rapidly and effectively transmit requests to, and acquire information from, response centers during major incidents or any other emergency situation where time is of the essence.

Figure 1:
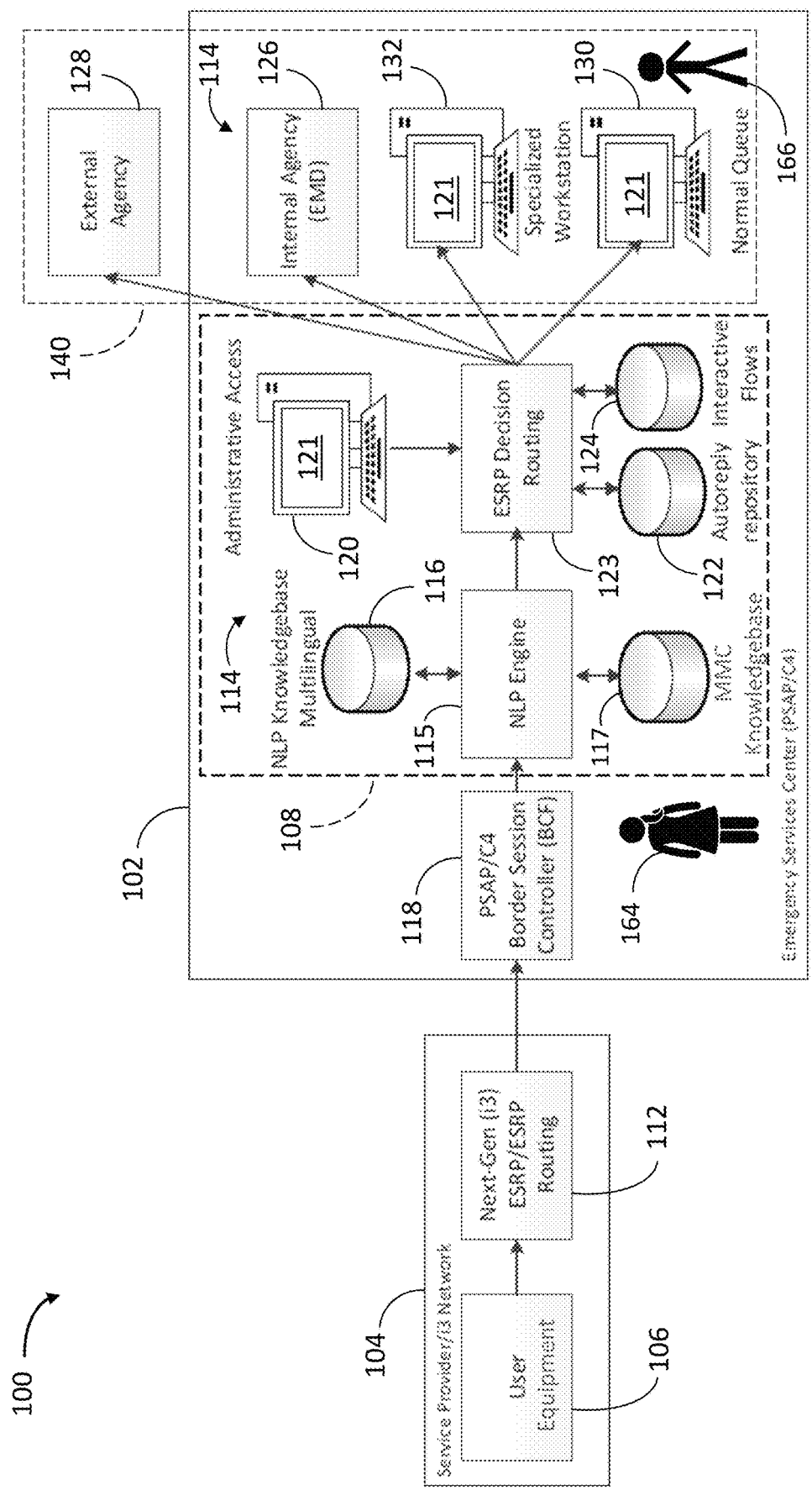
FIG. 1 is a block diagram of an example system for communicating with a contact center, according to an example embodiment.

FIG. 1 is a block diagram of an example system 100 for communicating with a contact center 102, according to an example embodiment. As shown, a UE 106 is connected to a wireless carrier network 104. In some embodiments, communications by and between UE 106 and other components of system 100 described herein is accomplished using wired (e.g. fixed) communications protocols and equipment, either instead of, or in addition to, utilizing the wireless carrier network 104. The UE 106 can be any type of computing device, including a mobile phone, tablet computer, personal computer, laptop computer, mobile phone with advanced computing capabilities, or any other type of device. The UE 106 includes, among other things, device hardware, software applications, a communications client, output devices (e.g., a display), and input devices (e.g., keyboard, mouse, touch screen, microphone, camera), etc. In some embodiments, a UE 106 may act as both an output device and an input device. Device hardware of the UE 106 includes physical computer components, such as a processor and memory.

The wireless carrier network 104, such as a cellular network, includes cellular towers, and one or more text control centers (TCCs) (e.g., for public safety) including short messaging service controller(s) (SMSCs), and a location-based service controller (not shown in FIG. 1). Additional wireless carrier networks 104 may further be included in the system 100.

The UE 106 is configured to communicate via the wireless carrier network 104 with server(s) of an emergency services routing proxy (ESRP) 112, which performs ESRP routing of calls and messages from UE 106 to contact center 102. In one embodiment, the ESRP 112 server is, or includes, a next-generation (i3) ESRP. In some embodiments, the connection between the wireless carrier network 104 and the ESRP 112 server(s) is via standards-based Internet Protocol (IP) interface technologies such the XML (Extensible Markup Language) protocol, SMPP (Short Message Peer to Peer protocol), REST (Representational State Transfer) protocol, and/or MSRP (Message Session Relay Protocol).

The server(s) of ESRP 112 includes a software application executed by a processor that is configured to generate messages sent between the UE 106 and a contact center 102. The server(s) of ESRP 112 is in communication with one or more databases of a BCF (border session controller) 118. The databases are configured to store data, such as communication logs between the UEs 106 and the contact centers 102. The databases of BCF 118 can be any type of database, including relational databases, non-relational databases, file-based databases, and/or non-file-based databases, among others. The BCF 118 may provide IP communications security applicable at the ingress to any of the networks, including the PSAP. In one embodiment, the BCF 118 is, or includes, a PSAP/C4 border session controller (BCF).

In various embodiments, the servers of ESRP 112 may comprise one or more physical or virtual computing devices. The ESRP 112 server includes computer servers, databases, application layers, and web servers. The ESRP 112 server includes: (a) a public switch telephone network (PSTN) connection to contact center 102 for creating automated voice calls; (b) a plain old telephone service (POTS) connection to contact center 102 for creating automated voice calls; and/or (c) a SIP application session controller for communicating with contact center 102. The ESRP 112 server may be connected to a functional element called a location to service translation (LoST) server (also known as a location validation function (LVF) or an emergency control routing function (ECRF)). The LoST, based upon the location of the UE 106, determines the correct recipient contact center 102 of a communication from the UE 106 and destination Uniform Resource Identifier (URI). The LoST server may also provide the primary, secondary, and tertiary phone numbers to which the PSTN and/or POTS automated calls generated by ESRP 112 server are sent.

As shown in FIG. 1, contact center 102 comprises a commercial contact center, command, communications, and control center (C4), or a PSAP, for example. The contact center 102 is comprised of one or more live call takers who, upon receipt of an alert, open an application on a customer premise equipment (CPE) 114 to maintain a communications session with a UE 106. Within the contact center 102, the CPE 114 accepts incoming communications from the ESRP server 112 and based upon skills, locations, or other policies, as described in greater detail herein, routes the next incoming communications session to a call taker. In some embodiments, some contact centers 102 do not route calls, but the next available call taker picks up a new communications call upon receiving an incoming alert, call, message, and/or request.

Embodiments of the disclosure provide systems and methods for triaging and routing of emergency services communications sessions with the contact center 102, for example, an emergency contact center (i.e., a 911 call center) or PSAP. A user of the UE 106 initiates an SMS/MMS message via the wireless carrier network 104. The SMS/MMS message is routed to the ESRP 112 server. The ESRP 112 server then generates and transmits a message to the contact center 102. The message can be a telephone call via PSTN or POTS, or a SIP message. The message may include the wireless phone number, address, or handle of UE 106 in the automatic number identification (ANI) or SIP header that is displayed in CPE 114. SIP is a signaling communications protocol, widely used for controlling multimedia communication sessions such as voice and video calls over IP networks. According to some embodiments for communicating with the contact center 102, the ESPR 112 server may generate and transmit a SIP INVITE message.

In some embodiments, the SIP message may include location information for the UE 106, such as a PIDF-LO object (Presence Information Data Format Location Object). In one embodiment, the location information for the UE 106 is, or includes, the latitude and longitude of the UE 106 corresponding to the geospatial position from whence the UE 106 transmitted the first message. In some embodiments, location information may be required for requests for emergency assistance. In some implementations, location information may define to which contact center—PSAP, C4, or commercial—the messages are routed. For example, when communicating with the number "9-1-1," physical handset (e.g., UE 106) location may be used as location information.

In further embodiments, one or more photo, audio, and/or other multimedia file(s) may be included in the SIP message. The audio file may be informative, such as "you have a text call," or empty. Any other type of file or additional information may also be included in the SIP message. For example, a message sent from the UE 106 may include an attached photo either instead of, or in addition to, including text. The SIP message may include custom headers denoting what non-voice multimedia/date is being shared. The SIP message from the ESRP 112 server is received for processing by a system 108 for routing of communications sessions with the contact center 102. In some embodiments, at least a portion of the functionality of system 108 resides in and/or is accessible by the CPEs 114 and an administrator workstation 120 of, or associated with, the contact center 102. Contact center 102 personnel interact with system 108 using the CPEs 114 and the workstation 120, one or more of which having a display device 121 to facilitate such interactions.

Figure 2:
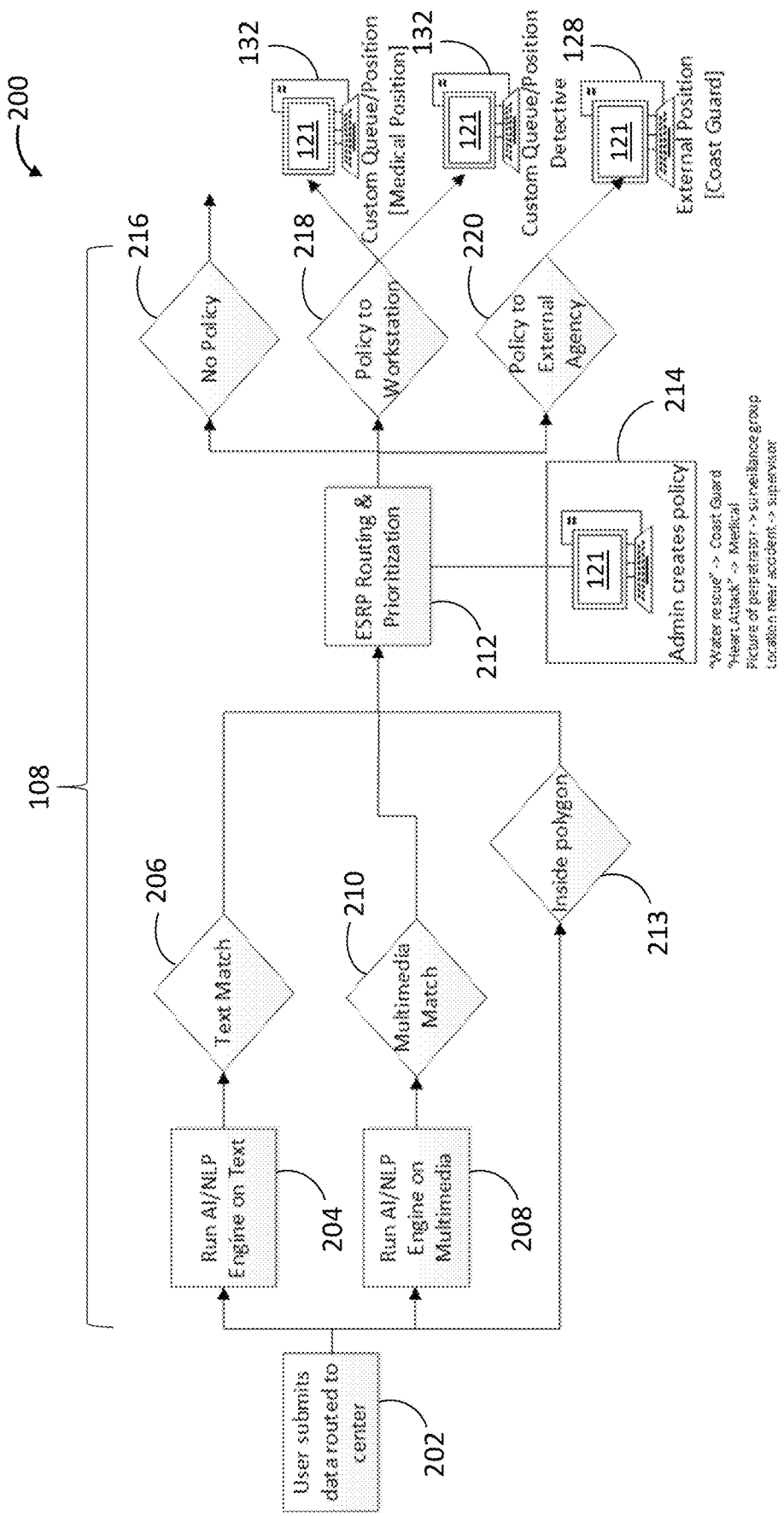
FIG. 2 is a flow diagram of data flows for triaging and routing emergency communications sessions using the system of FIG. 1, according to an example embodiment.
Figure 3:
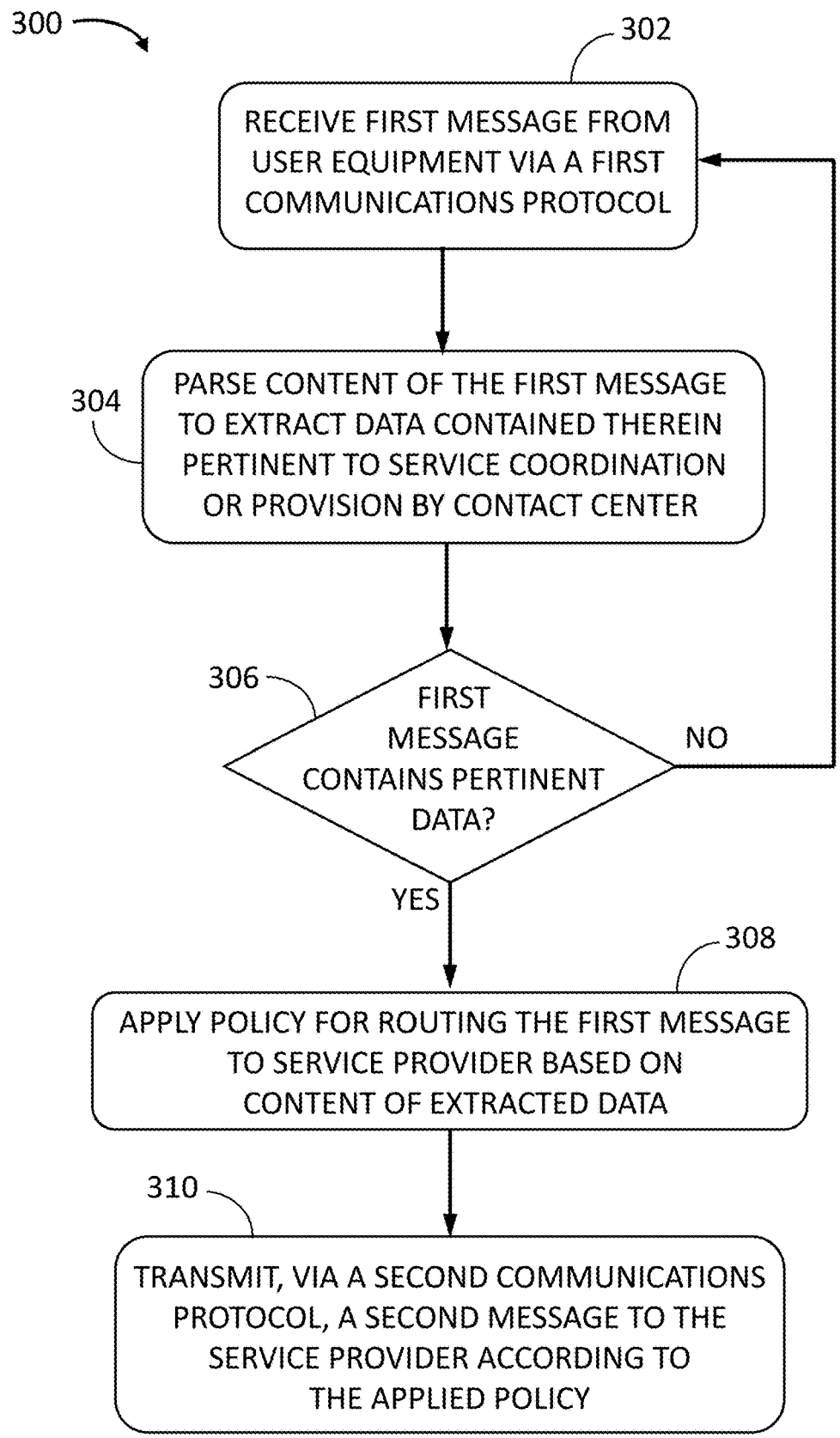
FIG. 3 is a flow diagram of method steps for triaging and routing emergency communications sessions using the system of FIG. 1, according to an example embodiment.

FIG. 2 is a flow diagram of a data flow process 200 for triaging and routing emergency communications sessions using the system 108 of FIG. 1, according to an example embodiment. FIG. 3 is a flow diagram of method 300 steps for triaging and routing communications sessions with the contact center 102 using, for example and without limitation, the system 108 of FIG. 1 and the process 200 of FIG. 2, according to an example embodiment. Referring to FIGS. 1-3, the method 300 includes the steps of: (a) receiving 302 a first message from the UE 106; (b) parsing 304 content of the first message to extract data contained therein pertinent to service coordination or provision by the contact center 102; (c) determining 306, based on the data extracted in the parsing 304 step, whether or not the first message contains data that is pertinent to service coordination or provision by the contact center; (d) in response to the first message containing data that is pertinent to service coordination or provision by the contact center 102, applying 308 a policy for routing the first message to a service provider 140 based on a content of the extracted data; and (e) transmitting 310 a second message to the service provider 140 according to the applied 308 policy.

As implemented by system 108, the method 300 described herein leverages various forms of intelligent routing dictating where and/or to whom at least a portion of the first message is to be transmitted 310. This automated or semi-automated routing decision is determined based upon message content and/or originating location prior to being received by a 9-1-1 center tasked with coordinating and/or providing responsive emergency services. In some embodiments, inbound requests for service come in from the wireless carrier network(s) 104.

As shown in FIG. 2, at a process 200 block 202, the first message sent by the UE 106 is received 302 by system 108 following the ESRP 112 server processing, as described above with reference to FIG. 1 (e.g., system 108 receives 302 the first message sent by the UE 106 via the ESRP 112 server). System 108 receives 302 the first message from the UE 106 via a first communications protocol. The first communications protocol is bidirectional, such that the contact center 102 and the UE 106 may engage in a two-way communication session, as needed. Examples of communications channels for receipt 302 of the first message include, without limitation, SMS, MMS, next-generation IP telephony (e.g., SIP), instant messaging, Facebook Messenger, RCS, WhatsApp, Apple Business Chat, among others. In some embodiments, processor(s) of system 108 cause an acknowledgement message to be transmitted (e.g., as a "canned" message, stored in, and retrieved by system 108 processor(s) from, an autoreply repository memory component 122 of system 108) to the UE 106 in response to receiving 302 the first message.

At least a portion of the received 302 first message may include text in a foreign language that is different from a language customarily used by the contact center 102 and/or the service provider(s) 140. In such cases, at a process 200 block 204, processor(s) of system 108 (e.g., utilizing an NLP engine component 115) cause at least a portion of such foreign language text to be forwarded to a multilingual NLP knowledgebase 116 for translating the foreign language text to the language customarily used by the contact center 102 and/or the service provider(s) 140. The system 108 processor(s) cause the translated text to be received from the multilingual NLP knowledgebase 116 for use in one or more of the parsing 304, determining 306, applying 308, and transmitting 310 steps of method 300.

In some embodiments, the processor(s) of system 108 cause the received 302 first message containing text in any language to be automatically forwarded by to the multilingual NLP knowledgebase 116, and the multilingual NLP knowledgebase 116 determines a presence of the foreign language text in the first message. In other embodiments, system 108 processor(s) determine the presence the foreign language text in the first message and cause the received 302 first message to be forwarded to the multilingual NLP knowledgebase 116 in response to determining the presence of foreign language text in the first message. In some embodiments, at least a portion of the functionality of the multilingual NLP knowledgebase 116 is provided by a third party other than the contact center 102 and/or the service provider(s) 140 (e.g., in the "cloud" as software-as a-service (SAAS)) and system 108 processor(s) cause data to be transmitted to, and received from, such third party multilingual NLP knowledgebase 116 computing resources via network communication (e.g., using Internet, cellular, and/or satellite network communication protocols and equipment). In other embodiments, at least a portion of the functionality of the multilingual NLP knowledgebase 116 resides in system 108 as an embedded component.

At least a portion of the received 302 first message may include multimedia content. For example, and without limitation, the first message may include audio content in the form of a live or prerecorded phone call, a voicemail, and/or an audio clip file (e.g., .mp3 or .wav file(s), obtained by a microphone of the UE 106). In such cases, processor(s) of system 108 (e.g., utilizing the NLP engine component 115 at process 200 block 204) cause at least a portion of such audio content to be forwarded to a speech-to-text (STT) knowledge base (not shown in FIG. 1) for converting such audio content to corresponding text. The system 108 processor(s) cause the converted text to be received from the STT knowledgebase for use in one or more of the parsing 304, determining 306, applying 308, and transmitting 310 steps of method 300.

At least a portion of the received 302 audio content may include speech in a foreign language that is different from the language customarily used by the contact center 102 and/or the service provider(s) 140. In such cases, at, for example, process 200 block 204, processor(s) of system 108 (e.g., utilizing the NLP engine component 15) cause at least a portion of such foreign language speech audio content to be forwarded to the multilingual NLP knowledgebase 116 for translating the foreign language speech to corresponding text and/or speech in the language customarily used by the contact center 102 and/or the service provider(s) 140. The system 108 processor(s) cause the translated and converted text and/or speech to be received from the multilingual NLP knowledgebase 116 for use in one or more of the parsing 304, determining 306, applying 308, and transmitting 310 steps of method 300.

In some embodiments, the system 108 processor(s) cause the received 302 first message containing audio content including speech in any language to be automatically forwarded to the NLP knowledgebase 116, and the NLP knowledgebase 116 determines a presence of the foreign language speech audio content in the first message. In other embodiments, system 108 processor(s) determine the presence the foreign language speech audio content in the first message and cause the received 302 first message to be forwarded to the NLP knowledgebase 116 in response to determining the presence of foreign language speech audio content in the first message. In some embodiments, at least a portion of the functionality of the ST knowledgebase is provided by a third party (e.g., in the cloud as SAAS)) and system 108 processor(s) cause data to be transmitted to, and received from, such third party STT knowledgebase computing resources via network communication (e.g., using Internet, cellular, and/or satellite network communication protocols and equipment). In other embodiments, at least a portion of the functionality of the STT knowledgebase resides in system 108 as an embedded component. In yet other embodiments, the STT knowledgebase is included in the NLP knowledgebase 116.

At least a portion of the first message sent by the UE 106 may be received 302 by system 108 as an unsecured data transmission. For example, the first message may include personally identifying information (PII) or personal health information (PHI) subject to government regulations (e.g., HIPAA). In some embodiments, processor(s) of system 108 cause the received 302 unsecured data transmission to be encrypted or otherwise secured (e.g., at a process 200 block 212, and using an ESRP routing decision component 123 of system 108) prior to the second message being transmitted 310 to the service provider 140.

For the parsing 304 step of method 300, processor(s) of system 108 determine 306 (e.g., at process 200 block(s) 206 and/or 210, and using the ESRP routing decision component 123) whether or not the first message contains the pertinent data. If system 108 processor(s) determine 306 that the first message does not include the pertinent data, then system 108 processor(s) wait for a next first message to be received 302. If, however, system 108 processor(s) determine 306 that the first message does include the pertinent data, then the system 108 processor(s) cause the method 300 to proceed to the applying 308 step.

As used herein, the terms "match type" and "match intent" mean a definition match between at least a portion of text and/or multimedia content contained in the first message received 302 from the UE 106 and a set of predetermined definitions stored in one or more memory device(s) positioned in, and/or remote from, and in communication with, processor(s) of system 108. As a non-limiting example, a first message received 302 from UE 106 as a text message containing the phrase "heart attack" and also including a street address would, using the below described methodologies, be determined 306 in method 300 to have a match type of medical emergency and a match intent of requesting an ambulance be sent to the provided address. Another non-limiting example is the first message received 302 from UE as a picture message has a photo of a car wreck along with a civilian knelt beside a prone driver near the car wreck. In this case, the match type would be car accident and the match intent would be send emergency response service provider(s) 140 to the scene of the accident (e.g., according to the UE 106 location from whence the received 302 first message was sent). As further described below, multimedia match type and/or match intent is/are inclusive of definitions associated with content such as firearm, knife, car, accident, or bomb, and type such as violent, nudity, sexual content, or obscenities. Match intents may result in routing a call to a specialist, and a match type may result in overriding (e.g., not applying 308) the policy routing rule and forwarding it to a supervisor or surveillance group. This avoids sending sensitive multimedia to a call taker or dispatcher not trained to receive multimedia, as further described below.

In cases where at least a portion of the received 302 first message includes text, for the determining 306 step of method 300, at process 200 block 204, and utilizing the NLP engine component 115, system 108 processor(s) cause at least a portion of the first message text to be forwarded to the NLP knowledgebase 116 for matching word(s) and/or phrase(s) in the NLP knowledgebase 116 to corresponding word(s) and/or phrase(s) of the first message text. In some embodiments, the NLP knowledgebase 116 uses AI for this textual matching. At a process 200 block 206, and utilizing the NLP engine component 115, the system 108 processor(s)

cause the match type(s) and/or match intent(s) to be received from the NLP knowledgebase 116 for use in the parsing 304, determining 306, applying 308, and/or transmitting 310 steps of the method 300.

In some embodiments, NLP knowledgebase 116 is or includes the multilingual NLP knowledgebase 116. In cases where at least a portion the received 302 first message includes foreign language text, for the determining 306 step of method 300, at process 200 block 204, and utilizing the NLP engine component 115, processor(s) of system 108 cause at a portion of the foreign language text to be forwarded to the multilingual NLP knowledgebase 116 for the matching of word(s) and/or phrase(s) in the multilingual NLP knowledgebase 116 to corresponding word(s) and/or phrase(s) of the foreign language text of the first message text. In some embodiments, the multilingual NLP knowledgebase 116 uses AI for this foreign language textual matching. At process 200 block 206, and utilizing the NLP engine component 115, system 108 processor(s) cause the match type(s) and/or match intent(s) to be received from the multilingual NLP knowledgebase 116 for use in the parsing 304, determining 306, applying 308, and/or transmitting 310 steps of the method 300.

In some embodiments, the processor(s) of system 108 cause the received 302 first message containing text in any language to be automatically forwarded to the multilingual NLP knowledgebase 116, and the multilingual NLP knowledgebase 116 determines a presence of the foreign language text in the first message. In other embodiments, system 108 processor(s) determine the presence the foreign language text in the first message and cause the received 302 first message to be forwarded to the multilingual NLP knowledgebase 116 in response to determining the presence of foreign language text in the first message. In some embodiments, at least a portion of the functionality of the multilingual NLP knowledgebase 116 is provided by a third party (e.g., in the cloud as SAAS) and system 108 processor(s) cause data to be transmitted to, and received from, such third party multilingual NLP knowledgebase 116 computing resources via network communication (e.g., using Internet, cellular, and/or satellite network communication protocols and equipment). In other embodiments, at least a portion of the functionality of the multilingual NLP knowledgebase 116 resides in system 108 as an embedded component. In still other embodiments, the multilingual NLP knowledgebase 116 is or includes the NLP knowledgebase 116, or vice versa.

In some embodiments, in addition to match type(s) and/or match intent(s) being received by system 108 processor(s), the NLP knowledgebase 116 or multilingual NLP knowledgebase 116 returns, and system 108 processor(s) receive, one or more confidence levels. The confidence level(s) provided to system 108 processor(s) include probability value(s), percentage value(s), and/or other information indicative of a likelihood that the match type(s) and/or match intent(s) received from the NLP knowledgebase 116 represent actual match type(s) and/or actual match intent(s) for the corresponding word(s) or phrase(s) of the first message text.

In addition to, or instead of, the received 302 first message having audio content, at least a portion of the first message may include image, video, and graphics multimedia content. In such cases, for the determining 306 step of method 300, at process 200 block 208, and utilizing the NLP engine component 115, system 108 processor(s) cause at least a portion of the first message multimedia content to be forwarded to a multimedia content (MMC) knowledgebase 117 for matching multimedia feature(s) in the MMC knowledgebase to corresponding multimedia feature(s) of the first message multimedia content. In some embodiments, the MMC knowledgebase 117 uses AI for this multimedia content matching. At a process 200 block 210, and utilizing the NLP engine component 115, the system 108 processor(s) cause match type(s) and/or match intent(s) to be received from the MMC knowledgebase 117 for use in the parsing 304, determining 306, applying 308, and/or transmitting 310 steps of the method 300.

In some embodiments, the system 108 processor(s) cause the received 302 first message having any data content whatsoever (e.g., text, multimedia, or otherwise) to be automatically forwarded to the MMC knowledgebase 117, and the MMC knowledgebase 117 determines a presence of the multimedia content in the first message. In other embodiments, system 108 processor(s) determine the presence the multimedia content in the first message and cause the received 302 first message to be forwarded to the MMC knowledgebase 117 in response to determining the presence of multimedia content in the first message. In some embodiments, at least a portion of the functionality of the MMC knowledgebase 117 is provided by a third party (e.g., in the cloud as SAAS) and system 108 processor(s) cause data to be transmitted to, and received from, such third party MMC knowledgebase 117 computing resources via network communication (e.g., using Internet, cellular, and/or satellite network communication protocols and equipment). In other embodiments, at least a portion of the functionality of the MMC knowledgebase 117 resides in system 108 as an embedded component. In still other embodiments, the NLP knowledgebase 116 is or includes the MMC knowledgebase 117, or vice versa.

The multimedia content of the first message may include viewer- or listener-sensitive content including, without limitation, violence, guns, knives, other weapons, criminal activity, curse words, racist, sexist, xenophobic, homophobic, and other offensive speech, words, and/or phrases, human or animal injuries, human or animal corpses, separated, amputated, or mangled body parts of humans or animals, blood, wounds, nudity, sexual activity, fire, explosions, smoke, and/or content considered culturally inappropriate for viewing by minors. In such cases, at process 200 block 208, and utilizing the NLP engine component 115, system 108 processor(s) cause the first message multimedia content to be forwarded to the MMC knowledgebase 117 for matching the one or more viewer- or listener-sensitive multimedia content feature(s) in the MMC knowledgebase 117 to corresponding sensitive multimedia feature(s) of the first message multimedia content. At process 200 block 210, and utilizing the NLP engine component 115, system 108 processor(s) cause viewer- or listener-sensitive content match category(ies) to be received from the MMC knowledgebase 117 for use in the parsing 304, determining 306, applying 308, and/or transmitting 310 steps of the method 300.

In some embodiments, in addition to receiving the viewer- or listener sensitive content match category(ies) from the MMC knowledgebase 117, a "cleansed" version of the first message, or portions thereof, is generated. This cleansed version includes removed and/or obscured portions of textual, audible and/or visual information which contains some or all of the viewer- or listener sensitive content of the first message. In one embodiment, the processor(s) of system 108 cause the cleansed version of the first message to be received from the MMC knowledgebase 117 either instead of, or in addition to, receiving the viewer- or listener sensitive content match category(ies). In another embodiment, at, for example, process 200 block 210, and utilizing the NLP engine component 115, generates the cleansed version of the first message. In some embodiments, system 108 processor(s) cause two versions of the second message to be transmitted 310 to the service provider(s) 140: a first version including uncleansed portions of the first message, and a second version including the cleansed versions thereof.

In some embodiments, in addition to multimedia content match type(s), multimedia content match intent(s), and/or viewer- or listener-sensitive content match category(ies) being received by system 108 processor(s), the MMC knowledgebase 117 returns, and system 108 processor(s) receive, one or more confidence levels regarding the same. The confidence level(s) provided to system 108 processor(s) include probability value(s), percentage value(s), and/or other information indicative of a likelihood that these match type(s), match intent(s), and/or match category(ies) received from the MMC knowledgebase 117 represent actual match type(s), actual match intent(s), and/or actual viewer- or listener-sensitive content match category(ies) for the corresponding first message multimedia content.

In practice, the first message received 302 by processor(s) of system 108 may include just enough pertinent information for a determination 306 that the first message represents a legitimate request for services. In some embodiments, where the first message includes a geospatial location of the UE 106, system 108 processor(s) may deem the presence of UE 106 location data to be enough for an affirmative determination 306 that the first message includes the pertinent data. However, for effective provision or coordination of services, additional information may be needed or desired. In such cases, in response to determining 306 that the first message contains data that is pertinent to service coordination or provision by the contact center 102, at process 200 block 212, and utilizing the ESRP routing decision component 123, system 108 processor(s) may automatically determine that such additional or desired data is needed.

In some embodiments, system 108 processors determine that the first message lacks this additional required or desired data for the service coordination or provision by the contact center 102 based on the first message data extracted in the parsing 304 step. Upon such a determination being made, processor(s) of system 108 cause a request message to be transmitted to the UE 106. This request message directs the service-requesting UE 106 user to provide the additional required or desired data. In one embodiment, the second message may be transmitted 310 in method 300 to the service provider(s) 140 without such additional required or desired data, and the additional data is transmitted to the service provider(s) 140 after it is received from the UE 106. In another embodiment, system 108 processor(s) may wait until the additional required or desired data is received from the UE 106 before causing the second message to be transmitted 310 to the service provider(s) 140, such that the second message includes the additional required or desired data.

In response to determining that the first message lacks the additional required or desired data, system 108 processor(s) may cause the request message to be transmitted to the service-requesting UE 106 automatically based upon the received and/or determined match type(s), match intent(s), match category(ies), and/or pertinent data contained in the first message. In some embodiments, automatically transmitting the request message initiates a "back-and-forth" exchange of communication between the UE 106 and system 108 for purposes of obtaining the additional required or desired data. For this purpose, the system 108 processor(s) may read and retrieve particular request messages from an interactive flows repository memory component 124 storing automated request messages which are appropriate for transmitting to UE 106 based upon the determined match type(s), match intent(s), match category(ies), and/or pertinent data contained in the first message and/or subsequent messages received from the UE 106 during the course of the aforementioned back-and-forth communication exchange. In some embodiments, the back and forth communication exchange between UE 106 and system 108 facilitates triaging requests for service received by contact center 102 from a plurality of UEs 106.

For instance, where a number of first messages are received from multiple UEs 106, and whose determined match type(s), match intent(s), and/or pertinent data relate to services requested for a major flood event in a coastal city, receipt by system 108 of additional required or desired data including specific circumstances of people using respective UEs 106 may be advantageously utilized by system 108 in method 300 to facilitate prioritizing and triaging responses by service provider(s) 140. In such a flood emergency case, a higher priority may be assigned to one first message received from a UE 106 of a person floating down a river on a broken roof dismantled from a house, while another first message received from a UE 106 of another person located on a roof of a 10-story building that is surrounded by less than a foot of, but not structurally compromised by, the flood water may be assigned a lower priority. This prioritization and/or triaging facilitated by system 108 may also enable system 108 processor(s) to intelligently determine which of a plurality of service provider(s) 140 are available and/or best suited for responding to particular service requests from UEs 106. So, in the flood use case, the victim who is floating down the river and into a large bay may have his or her request attended to by a service provider 140 having the proper equipment and training for water rescues (e.g., Coast Guard), while the person on the roof of the building may have his or her request attended to by a service provider 140 having the necessary land vehicle (e.g., National Guard) to effect a land rescue.

Method 300 may include receiving a policy definition from a first user 164 and/or at least a second user 166 employed by, or otherwise associated with, the contact center 102 and/or the service provider(s) 140. For example, at a process 200 block 214, and using the ESRP routing decision component 123, system 108 processor(s) cause one or more policy definition(s) to be received from user(s) 164 and/or 166. The user(s) 164 and/or 166 may include a supervisor and/or an administrator (e.g., using the administrator workstation 120). At process 200 block 214, system 108 processor(s) cause the received policy(ies) to be stored in memory device(s) in communication with system 108 processor(s). In some embodiments, for the applying 308 step of method 300, the system 108 processor(s) cause the first message to be routed to the service provider(s) 140 according to the received policy definition. In such cases, the policy definition is received prior to receipt 302 of the first message in method 300.

The policy for the applying 308 step of method 300 may include multiple policies. In such cases, for applying 308 the policy for routing the first message to the service provider 140, system 108 processor(s) determine, based on the pertinent data and/or the UE 106 location(s), one or more of the plurality of policies to be applied 308 for routing the first message to the service provider.

As shown in FIG. 1, the service provider 140 may include multiple service providers 140 (e.g., agency(ies), individual(s), and/or individual personnel). In such cases, processor(s) of system 108 may determine (e.g., at process 200 block 212, and using the ESRP routing decision component 123) that the policy is applicable to routing the first message to more than one of the plurality of service providers 140. In some embodiments, for the applying 308 step of method 300, the system 108 processor(s) may determine and/or apply a prioritization scheme for prioritizing, based on the pertinent data and/or UE 106 location(s), a first of the plurality of service providers 140, over at least a second of the plurality of service providers 140, for routing (e.g., transmitting 310) the first message to.

In some embodiments, this prioritization scheme is determined and/or applied by system 108 processor(s) (e.g., at process 200 block 212, and using the ESRP routing decision component 123) prior to the second message being transmitted 310 to the first service provider. System 108 processor(s) may apply a predetermined prioritization scheme stored in memory or they may determine the prioritization scheme "on the fly," including based on static and/or dynamic information including, without limitation, as provided by the pertinent data and/or the UE 106 location(s). In such cases, the processor(s) of system 108 cause the second message to be transmitted 310 to the first service provider 140, and the second message may or may not be subsequently transmitted 310 to the at least a second service provider 140.

In some embodiments, the policy definition received by system 108 processor(s) may include a start time and an end time. The start time provides a clock time and a date at which the defined policy becomes and became effective (e.g., applicable) for use in the applying 308 step of method 300. The end time provides a clock time and a date at which the defined policy becomes and became expired (e.g., no longer applicable) for use in the applying 308 step of method 300. Where the received policy definition includes the start and end times, the applying 308 step of method 300 includes (e.g., at process 200 block 212, and using the ESRP routing decision component 123) applying 308 the policy for routing the first message for one or more first message(s) received: at or after the start time, and at or before the end time.

In some embodiments, the first message may include at least an estimate of the geospatial UE 106 location (e.g., latitude-longitude data) from whence the UE 106 sent the first message to the contact center 102. Where the policy definition received by system 108 processor(s) includes a service provider 140 location (e.g., a location-based policy), processor(s) of system 108 (e.g., at process 200 block 212, and utilizing the ESRP routing decision component 123) determine, based on the UE 106 location, a nearest service provider location and/or a most appropriate service provider location, for the applying 308 step of method 300.

For a plurality of first messages received 302 by system 108 processor(s) from a plurality of UEs 106, all or some of the plurality of first messages may include the UE 106 location from which respective UEs 106 sent their first messages to the contact center 102. In some embodiments, processor(s) of system 108 (e.g., at process 200 block 212, and utilizing the ESRP routing decision component 123) cause the UE 106 location to be plotted on a map for each of the plurality of first messages for viewing on display device(s) 121 by user(s) 164 and/or 166 on the CPE 114 (e.g., administrator workstation 120).

Where multiple first messages including respective UE 106 locations are received 302 (e.g., consecutively and/or concurrently) by contact center 102, method 300 may include determining that at least two of the plurality of first messages pertain to a single service request category. In some embodiments, processor(s) of system 108 (e.g., at process 200 block 212, and utilizing the ESRP routing decision component 123) may determine that the received 302 first messages pertain to a single service request category based on the UE 106 locations and/or the pertinent data. In response to determining that the first messages pertain to the single service request category, system 108 processor(s) (e.g., at process 200 block(s) 218 and/or 220, and utilizing the ESRP routing decision component 123) apply 308 the policy to cause those first messages to be routed to one or more service provider(s) 140 according to the determined single request category. In consequence thereof, the second message(s) are transmitted 310 to the service provider(s) 140 coordinating and/or providing services for the determined single request category.

In some embodiments, a location-based policy definition is received by the system 108 processor(s) via interaction of user(s) 164 and/or 166 with the map being viewed on the display device(s) 121. At, for example, process 200 block 212, and using the ESRP routing decision component 123, system 108 processor(s) may receive, via the user interaction with map, a grouping of at least two UE 106 locations on the map. The received grouping corresponds to at least two of the received 302 first messages pertaining the single service request category. In this case, the single service request category may have been determined by the processor(s) of system 108 as described above, or it may have been assigned by system 108 processor(s) at the direction of user(s) 164 and/or 166 through the aforementioned map interaction(s).

Where the grouping of UE 106 locations is received via the user interaction with the map, the location-based policy is thereby defined in method 300. For the applying 308 step of method 300, system 108 processor(s) (e.g., at process 200 block(s) 218 and/or 220, and utilizing the ESRP routing decision component 123) apply 308 this user-defined location-based policy to cause the so-grouped first messages to be routed to one or more service provider(s) 140 according to the received grouping. In some embodiments, this received grouping may correspond to the system 108- and/or user-determined single request category. In consequence thereof, the second message(s) is/are transmitted 310 to the service provider(s) 140 coordinating and/or providing services for the received grouping and/or the determined single request category.

In some embodiments, the policy definition received by system 108 processor(s) may include a location intensity. For a plurality of received 302 first messages, the location intensity is defined as a number of the first messages received 302: from a predetermined geospatial area or predetermined range of geospatial areas or locations, and/or within a predetermined amount of time. Where the received policy definition includes the location intensity, the applying 308 step of method 300 includes (e.g., at process 200 block 212, and using the ESRP routing decision component 123) applying 308 the policy for routing the first messages according to the location intensity. Based on the location intensity, the UE 106 locations, and/or the pertinent data, for the plurality of received 302 first messages, system 108 processor(s) (e.g., at process 200 block 212, and using the ESRP routing decision component 123) may determine that those first messages pertain to a single service request category. As a result, processor(s) of system 108 (e.g., at process 200 block(s) 218 and/or 220, and utilizing the ESRP routing decision component 123) cause the second message(s) to be transmitted 310 to the service provider(s) coordinating or providing services for the determined single request category.

In method 300, the location intensity policy definition may be applied 308 in conjunction with the start and end time policy definition. For instance, a flood event localized to a waterfront area of a city may occur, and a first of many first messages regarding the flood may be received 302 in method 300 at a start time of Day 0 at noon. Based on contact center 102 and/or service provider 140 expertise in consultation with weather reports, an end time of Day 2 at midnight is included in the defined policy. Then, first messages received in the geospatial area defined on the map that meet both the location intensity and start/end time policies are applied 308 in method 300 for the single service category determined to relate to the flood emergency, and associated second messages are accordingly transmitted 310 to those service provider(s) 140 coordinating and/or providing the flood-related services.

The received policy definition may include a user-predetermined threshold accuracy defining a minimum acceptable accuracy for the parsing 304, determining 306, applying 308, and/or transmitting 310 steps of method 300. The threshold accuracy may be the same value (e.g., >79%) for all first messages received 302, or it may vary depending on the particular service request scenario for which system 108 processor(s) determine the pertinent data of the first message relates to (e.g., >89% for a minor vehicle accident with no injuries versus >39% for a stabbing victim who is bleeding and unconscious, but still alive). Thus, more serious requests for services may get prioritized attention despite potentially having lower accuracies as compared to less serious requests, while less serious requests may be investigated further prior to scarce service provider 140 resources being committed. In one embodiment, where a reported accuracy for computed results provided by system 108, NLP knowledgebase 116, STT knowledgebase, and/or MMC knowledgebase 117 in method 300 does not meet the threshold accuracy, system 108 processor(s) may cause an alert message to be transmitted to user(s) 164 and/or 166 to alert them of this fact. In such cases, user(s) 164 and/or 166 may be provided an opportunity to divert the first message from system 108 processing to manual handling and routing modes. In another embodiment, in cases where this accuracy does not satisfy the threshold, system 108 processor(s) may cause the first message to be automatically diverted to manual handling and routing modes.

In some embodiments, at, for example, process 200 blocks 204, 206, 208, 210, and/or 212, and using the NLP engine 115 and/or ESRP routing decision 123 component(s), system 108 processor(s) may cause feedback to be received (e.g., from user(s) 164 and/or 166 of contact center 102 and/or service provider(s) 140) on an accuracy of computed results provided by system 108, NLP knowledgebase 116, STT knowledgebase, and/or MMC knowledgebase 117, and used in the parsing 304, determining 306, applying 308, and/or transmitting 310 steps of method 300. This feedback received from user(s) 164 and/or 166 may be advantageously employed for supervised machine learning to improve the accuracy of the parsing 304, determining 306, applying 308, and/or transmitting 310 steps of method 300. For implementing the received feedback to improve the accuracy, system 108 processor(s), automatically and/or as directed by users 164 and/or 166 (e.g., at process 200 blocks 204, 206, 208, 210, and/or 212, and utilizing the NLP engine 115 and/or ESRP routing decision 123 component(s)), cause one or more of the policy definitions for the applying 308 step to be updated.

This supervised machine learning phase in method 300 may include manual and/or automatic labeling of computed data provided by system 108, NLP knowledgebase 116, STT knowledgebase, and/or MMC knowledgebase 117, and adjusting and/or applying machine learning algorithm(s) to predict output data from the input data (e.g., data extracted from first message(s) in the parsing 304 step). As such, system 108, NLP knowledgebase 116, STT knowledgebase, and/or MMC knowledgebase 117 may improve the accuracy of their computed results by comparing such results (e.g., returning data indicating a car involved in an accident) to what was actually reported in the first message and/or observed by service provider(s) 140 on the scene (e.g., a motorcycle was actually involved in the accident).

With additional feedback received over time and for new data scenarios, the computational accuracy of system 108, NLP knowledgebase 116, STT knowledgebase, and/or MMC knowledgebase 117 can be expected to improve. Thus, a computational accuracy of 70% (e.g., computed results correctly correspond to the real world ground observations by humans) for a first presentation to system 108 of the vehicle accident example may be expected to improve to, for example, >95% after 10's, 100's, or 1000's, or more, of presentations of similar scenarios (e.g., the computed results would correctly report that it was a motorcycle, and not a car, that was involved in the accident).

In some embodiments, at, for example, process 200 blocks 204, 206, 208, 210, and/or 212, and using the NLP engine 115 and/or ESRP routing decision 123 component(s), system 108 processor(s) cause the receiving 302, parsing 304, determining 306, applying 308, and/or transmitting 310 steps of method 300 to be iteratively performed for one or more iterations. This iterative performance of method 300 step(s) may be implemented by system 108 processor(s) using simulated first messages, actual ("real-world") first messages, or both, during the supervised machine learning phase for purposes of improving the accuracy, as described above. For the one or more iterations performed in method 300, system 108 processor(s) and/or user(s) 164 and/or 166 monitor the accuracy of the computed results provided by the system 108, the NLP knowledgebase 116, the STT knowledgebase, and/or the MMC knowledgebase 117 for use in the parsing 304, determining 306, applying 308, and/or transmitting 310 steps of method 300. This monitoring may either be continuous for all received 302 first messages, or it may be done periodically according to a user-predetermined interval.

The aforementioned iterative performance and/or monitoring in method 300 may be performed during an unsupervised machine phase. In contrast to the supervised machine learning phase, in the unsupervised machine learning all or part of the computed data provided by system 108, NLP knowledgebase 116, STT knowledgebase, and/or MMC knowledgebase 117 is unlabeled, and the machine learning algorithms learn inherent structure (e.g., patterns) from the input data. In some embodiments, during this unsupervised machine learning phase, system 108 processor(s) (e.g., at process 200 blocks 204, 206, 208, 210 and/or 212, and using the NLP engine 115 and/or ESRP routing decision 123 component(s)), cause the one or more of the policy definitions for the applying 308 step to be updated, so as to improve the accuracy and/or outcome efficiency(ies) of method 300 steps. In some embodiments, at least a portion of the machine learning algorithms and/or related functionality for the supervised and/or unsupervised machine learning phase(s) is/are provided by a third party (e.g., in the cloud as SAAS) and system 108 processor(s) cause data to be transmitted to, and received from, such third party machine learning computing resources via network communication (e.g., using Internet, cellular, and/or satellite network communication protocols and equipment). In other embodiments, at least a portion of the machine learning algorithms and related functionality for the supervised and/or unsupervised machine learning phase(s) reside in system 108 as an embedded component.

In some embodiments, system 108 processor(s) may cause method 300 to return to the supervised machine learning phase if the accuracy of computed results provided by system 108, NLP knowledgebase 116, STT knowledgebase, and/or MMC knowledgebase 117 does not meet the threshold accuracy. In one embodiment, method 300 returns to supervised machine learning when system 108 and/or user(s) 164 and/or 166 observe just one such computed result not meeting the threshold accuracy. In another embodiment, processor(s) of system 108 cause the method 300 to return to the supervised machine learning phase when an average value of multiple same or similar computed results does not meet the threshold accuracy. In yet another embodiment, processor(s) of system 108 cause the method 300 to return to supervised machine learning when an average value of any and all computed results does not meet the threshold accuracy embodiment. Where, in method 300, system 108 processor(s) and/or user(s) 164 and/or 166 do not observe computed results provided by system 108, NLP knowledgebase 116, STT knowledgebase, and/or MMC knowledgebase 117 that do not meet the threshold accuracy, then processor(s) of system 108 cause the method 300 to continue to be performed in the unsupervised learning phase.

In some embodiments, the second message may be transmitted 310 to a service provider 140 outside the contact center 102 (e.g., an external agency 128, such as a police department), to a service provider 140 of the contact center 102 (e.g., an internal agency 126 located inside the contact center 102, such as an ambulance or emergency medical dispatch (EMD)), to a specialized staff member's workstation 132 either inside or outside the contact center 102 (e.g., a police detective, or a trained medical staff member), and/or to a staff member or automated workflow process designated for handling service requests under a normal queue (e.g., to a staff member's CPE workstation 130 positioned either inside or outside the contact center 102).

The second message transmitted 310 to the service provider(s) 140 includes at least a portion of the pertinent data extracted from the first message (e.g., in the parsing 304 step of method 300). In some embodiments, at a process 200 block 216, and using the ESRP routing decision 123 component, processor(s) of system 108 cause the entirety of the first message to be transmitted 310 (e.g., relayed) to the service provider(s) 140 as either an unsecured, or at least partially encrypted or otherwise secured, data transmission. The first message may be relayed to the service provider(s) 140 in this manner in cases where no policy is applicable for the applying 308 step of method 300 and/or where one or more service provider(s) 140 have specified that the entirety of the first message should be relayed to them in addition to system 108 transmitting 310 the second message (e.g., as a "fail-safe" measure).

Processor(s) of system 108 cause the second message to be transmitted 310 to one or more of the service providers 140 via a second communications protocol. In one embodiment, the second communications protocol is the same as the first communications protocol. In another embodiment, the second communications protocol is different from the first communications protocol. In some embodiments, the second communications protocol is bidirectional, such that the service provider(s) 140 may engage in a two-way communications session with the UE 106 and/or the contact center 102, as needed or desired. Examples of communications channels for transmission 310 of the second message include, without limitation, SMS, MMS, next-generation IP telephony (e.g., SIP), instant messaging, Facebook Messenger, RCS, WhatsApp, Apple Business Chat, among others.

Prior to transmitting 310 the second message, processor(s) of system 108 may cause all or part of the second message to be formatted for use by service provider 140 systems and/or software, including, without limitation, in a format conforming, or at least compatible, with a standardized system format for viewing, processing, and/or otherwise effectively using the data contained in the second message. Formatting the second message in this manner may facilitate the speed and accuracy with which service provider(s) 140 provide and/or coordinate provision of service in response to the first message, and may further enable service provider(s) 140 to effectively share data contained in the second message with other service provider(s) 140 and/or other contact center(s) 102. In some embodiments, after, or simultaneously or concurrently with, transmitting 310 the second message to the service provider(s) 140, the processor(s) of system 108 may cause a confirmation message to be transmitted (e.g., as a canned message) to the UE 106 indicating that the service provider(s) 140 was/were contacted regarding the received 302 first message.

For transmitting 310 the first message to the service provider(s) 140, the processor(s) of system 108 may cause at least a portion of the data of the second message to be provided to the service provider 140 via an authenticated web portal for viewing by the service provider(s) 140 (e.g., via display device(s) 121). In some embodiments, processor(s) of system 108 may cause a notification message to be transmitted (e.g., as a canned message) to the service provider(s) 140 indicating the authenticated web portal is available for viewing.

In some embodiments, at a process 200 block 202, at least one additional message from the UE 106 may be received by system 108 processor(s) after receiving the first message. The additional message may include the additional required or desired data described above, and/or may include new information or request(s) for service. In such cases, processor(s) of system 108 (e.g., at process 200 block(s) 206 and/or 210, and using an ESRP routing decision component 123 of system 108) cause the content of the additional message(s) to be parsed 304 to extract data contained therein pertinent to the service coordination or provision by the contact center 102. If system 108 processor(s) determine that the additional message does not include the pertinent data, then system 108 processor(s) wait for a next first message to be received 302, and/or for a next additional message to be received.

If, however, system 108 processor(s) determine that the additional message does include the pertinent data, then at process 200 block 212, and utilizing the ESRP routing decision component 123, system 108 processor(s) apply 307 the policy for routing the additional message to the service provider(s) 140 based on a content of the data extracted therefrom. As a result, in method 300, processor(s) of system 108 (e.g., at process 200 blocks 218 and/or 220, and using the ESRP routing decision component 123) cause at least a third message to be transmitted 310 to the service provider(s) 140 according to the applied 308 policy. The third message includes at least a portion of the additional pertinent data extracted from the at least one additional message. Processor(s) of system 108 cause the third message(s) to be transmitted 310 to the service providers 140 via the second communications protocol.

EXAMPLES AND USE CASES

System Architecture

Inbound requests for service come in from the carriers and network providers on the wireless carrier network 104. Upon receipt of the first message from UE 106, the 9-1-1 contact center 102 (e.g., system 108) secures the first message. The NLP processing is performed on the incoming first message by the NLP engine 115 in communication with the NLP knowledgebase 116. Once NLP processing is complete, the system 108 matches the first message to any policies created by the 9-1-1 contact center 102 by the Emergency Services Routing Proxy (ESRP). This function performs a routing decision based upon NLP intent and other factors such as the UE 106 location, multimedia content, and data from other external services such as weather services, next-generation endpoints, and alarms, non-exclusively.

Once the ESRP determines where to route the new request for service or message, it is routed to an external agency 128 (outside the 9-1-1 contact center 102), an internal agency 126 within the 9-1-1 contact center 102 or local government, and/or workstations 132 of specialized positions such as a supervisor or specialized call taker. The original first message is forwarded along with translations, additional call details, and notes inserted by the ESRP as a result of the custom routing decision. For instance, a custom flow that queries the UE 106 for additional information, similar to a decision tree, is employed. Upon completion of the data collection, the entire collection is formatted and sent to the external agency 128. The format may be proprietary or may leverage industry standards whereby the ESRP data is embedded into existing fields. These formats may leverage and APIs such as ReST, JSON, next-generation VoIP, or session initiation protocol (SIP).

NLP Engine

The NLP engine (e.g., component 115 of system 108) parses incoming first messages and applies pattern matching tools (e.g., using a trained AI). The NLP engine leverages an intents dictionary that may be provisioned either by the 9-1-1 contact center 102 or by a system integrator (e.g., from third party computing resources including, without limitation, SAAS). Within the 9-1-1 contact center 102, an administrative portal (e.g., workstation 120) is provided that allows an administrator to create a custom policy that includes the phrases and/or words required for pattern matching. Administrator user(s) is/are able to enter the portal using username and password, or single sign on capability.

Figure 4:
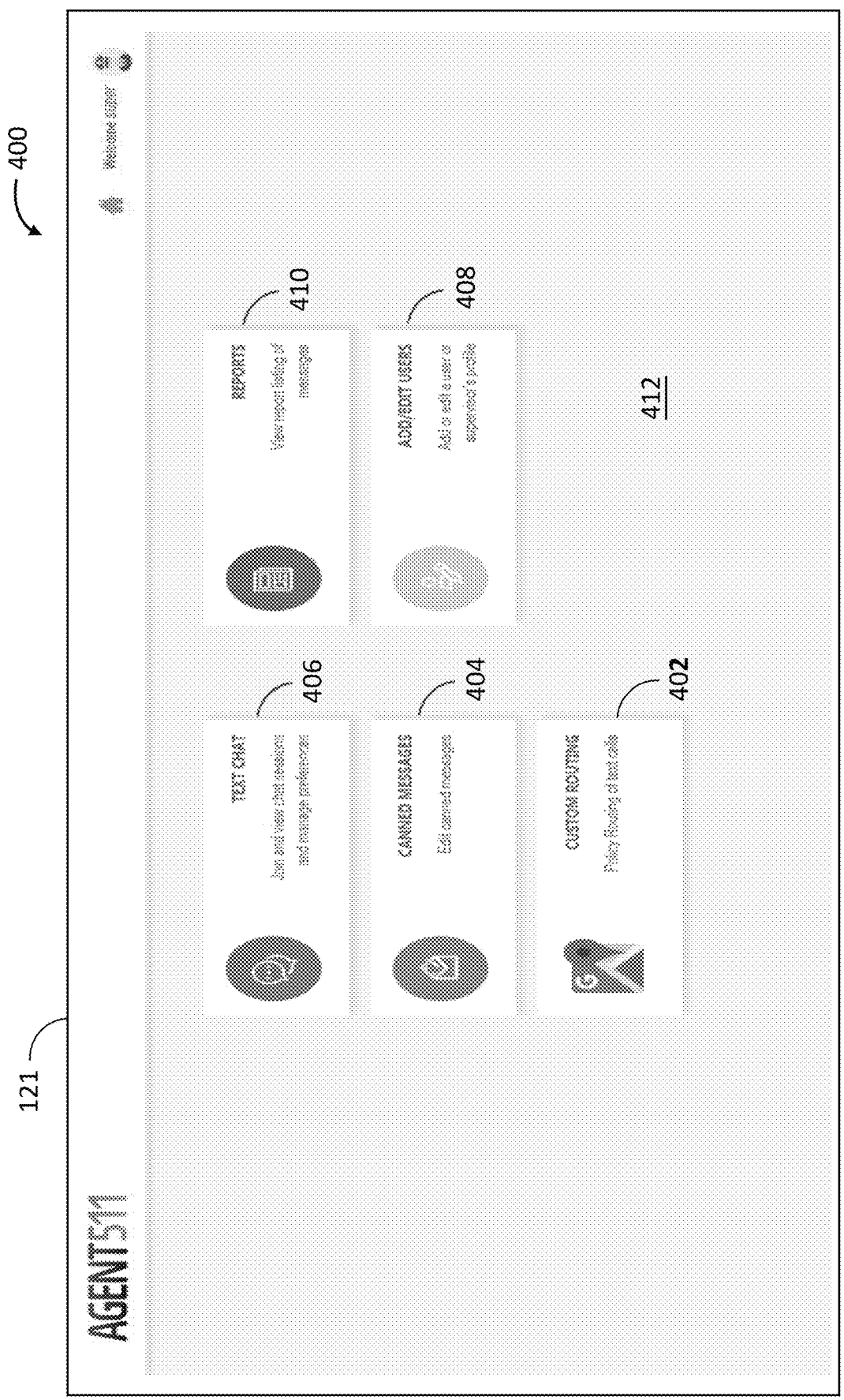
FIG. 4 depicts an example main dashboard with custom routing feature for use with the system of FIG. 1 and the method of FIG. 3, according to an example embodiment.
Figure 5:
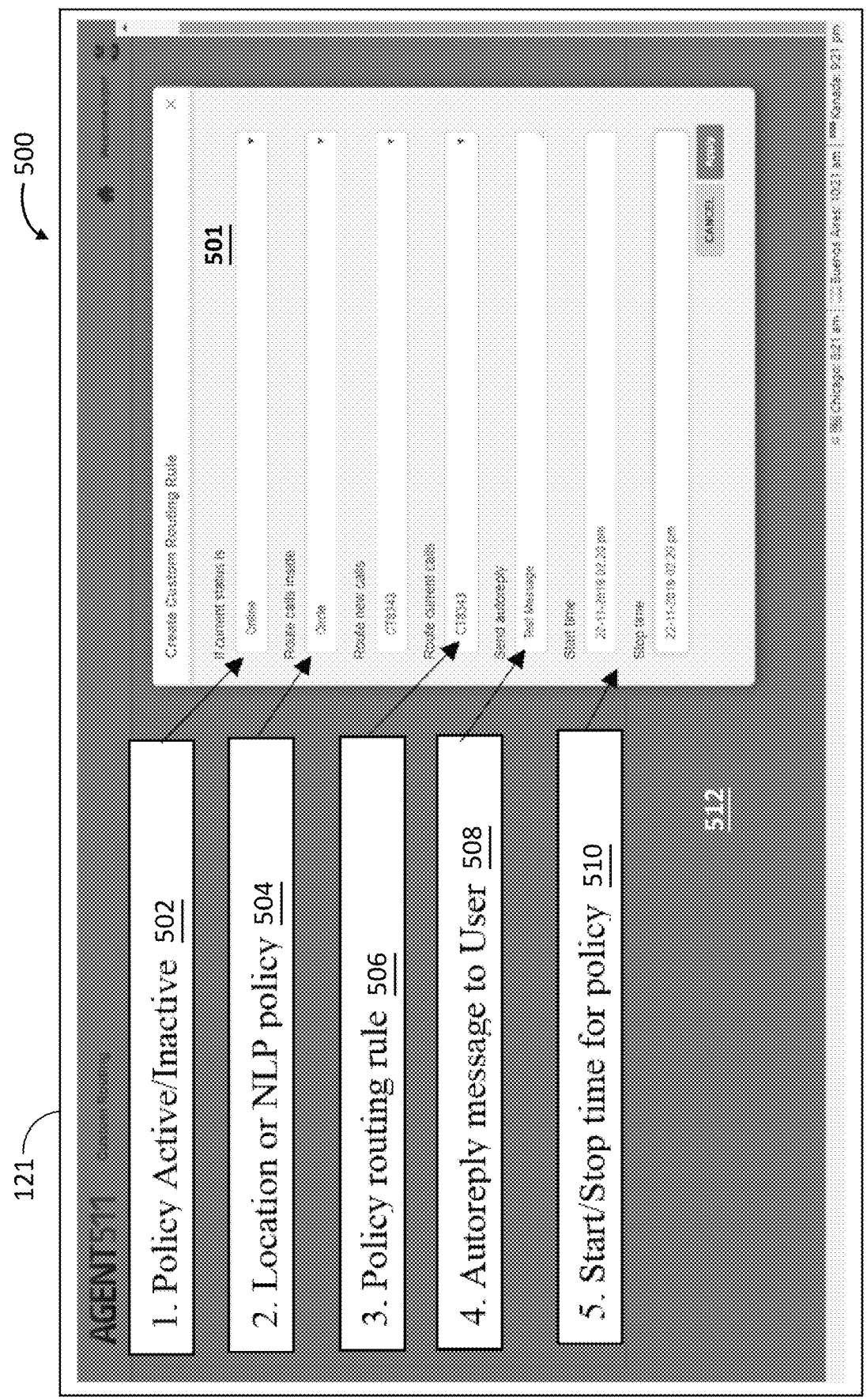
FIG. 5 depicts an example workflow page for implementing custom routing features from the main dashboard of FIG. 4, according to an example embodiment.

Once the administrator enters into a Customer Routing page, he/she is able to create a policy. FIG. 4 illustrates an example main dashboard 400 with custom routing feature 402 for this purpose. The main dashboard 400 is viewable by system 108 user(s) 164 and/or 166 having appropriate credentials on display device(s) 121. An example workflow page 500 for implementing the custom routing feature 402 is shown in FIG. 5. This workflow page 500 is viewable by system 108 user(s) 164 and/or 166 on display device(s) 121 following selecting the custom routing feature 402 from the main dashboard 400.

A sample NLP policy assigns any incoming expression of the phrase "heart attack" to a policy that routes the communication session to emergency medical dispatch or ambulance services. The incoming first message expression may include "heart attack," synonyms, or foreign languages, that match the phrase associated with the policy. An NLP policy may also include a multimedia content match that is described in a manner similar to NLP whereby the content of the multimedia and any specific intents are included or excluded.

ESRP

The ESRP (e.g., system 108 component 123) offers the administrator the ability to create a policy that includes matching conditions (NLP or location), autoreply or bounce back messages (e.g., canned messages) to the UE 106, start and end time, and custom routing rule(s). For an incoming communications session, the UE 106 may receive a preconfigured, automated message such as "We are aware of your emergency and your request for service is being routed to emergency medical personnel." A keyword or command the user of the UE 106 may supply to exit the policy may be included in the canned auto-reply message. For instance, for a location policy for applying to communications sessions relating to a vehicle accident that routes all calls from the vicinity to a dispatcher helping to deliver services to the incident, the command may be "help" or "exit." Another component of the policy is a start and end time so that a policy may automatically start and stop at specified initiation and expiration times/dates, respectively.

Figure 6A:
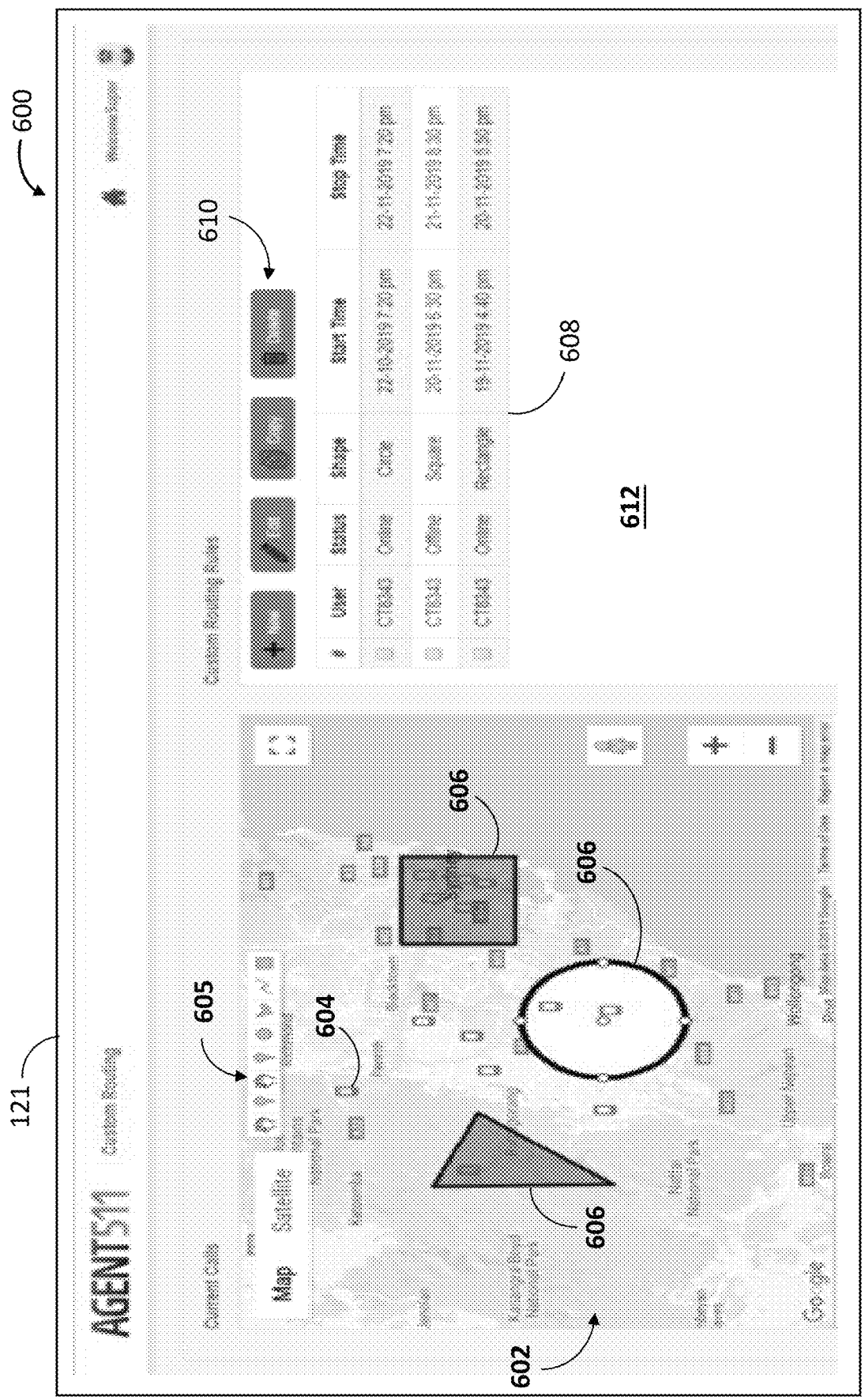
FIG. 6A depicts an overlay including a map for use with the system of FIG. 1 and the method of FIG. 3, according to an example embodiment.

As shown in FIG. 5, when the administrator selects whether the policy is location or NLP, an overlay will be shown that will permit him/her to create the policy. For NLP, a series of phrases or terms may be supplied. For location, an overlay 600 including a map 602 may be displayed with all locations 604 for UE 106-sent first messages, as shown in FIG. 6A. Via interactions (e.g., mouse pointing and clicking, in conjunction with a map toolbar 605) with the map 602 on the display device 121, the administrator may create one or more polygons 606, and corresponding details are provided on the display device 121 in a table 608, for instance. Referring to FIG. 2, these processes for creating polygon(s) 606 to group UE 106 locations may be performed and/or mediated by system 108 processor(s) at a process 200 block 213. Alternatively, or in addition to, creating polygon(s) 606 to group the UE 106 locations displayed on the map 602, the administrator may draw a freehand shape 614 to enclose two or more UE 106 locations and thus enclose a group of them, as shown in the overlay 616 of FIG. 6B.

The table 608 lists the location-based policies so-created by the system 108 administrator, and includes a toolbar 610 with which the administrator may edit the created policies, as needed. Once the polygon(s) 606 for the policy is/are added, the system 108 may be configured so that all new requests and existing ones may be applied. Once expired, all new requests that would have met the policy are routed with the policy being applied. Any existing request that met the policy may be routed to a normal queue workstation 130, or the request for service is terminated.

Figure 6B:
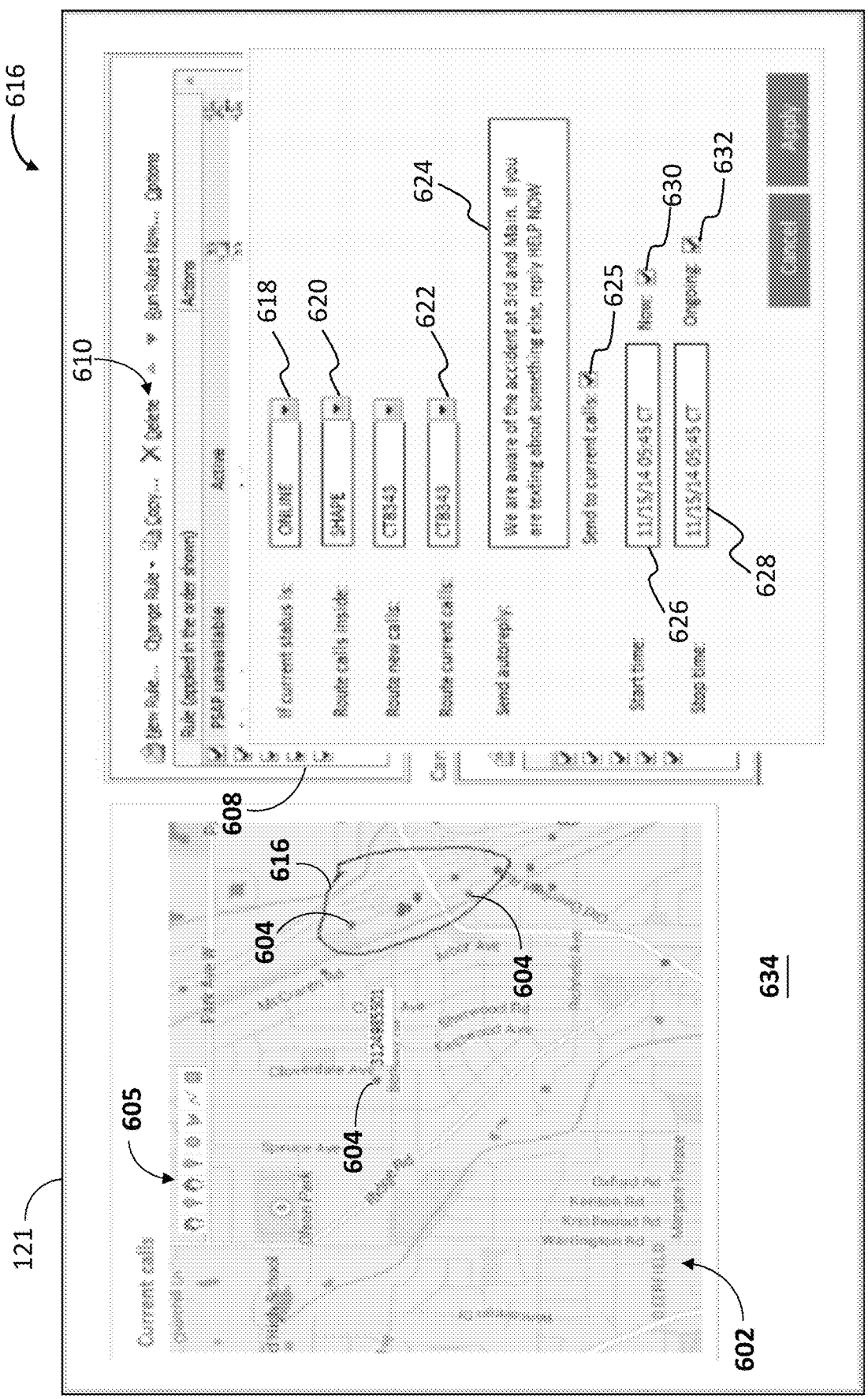
FIG. 6B depicts another overlay including a map for use with the system of FIG. 1 and the method of FIG. 3, according to another example embodiment.

In FIGS. 6A and 6B, the various current policies are listed in the table 608. Policies may be active/inactive until deleted. A new request for service may be copied and routed to multiple positions, however, this may not be in line with standard emergency services protocols. As such, the system 108 administrator may be provided with the include the ability to create policy prioritization schemes such that system 108 processor(s) then determine which policy should be invoked. For instance, a "heart attack" policy NLP text match near a car accident should be prioritized over a location policy. A photograph 701 of a car accident provided in a window 700 on the display device 121, as shown, for example, in FIG. 7, that meets multimedia content AI filter requirements should be routed to the dispatcher who is receiving all requests that meet location criteria. This can be done by either: (a) expressing a weight in the policy creation overlay shown in FIGS. 5, 6A and 6B; or (b) dragging and dropping policies in FIGS. 5, 6A and 6B. User(s) 166 and/or 168 (e.g., the system 108 administrator at his/her administrator workstation 120) may view and/or otherwise interact with (e.g., save the photograph 701 to system 108 memory and/or email it elsewhere) window 700 using a graphical user interface (GUI) 712 provided on the display device 121.

Multimedia Routing Policy

Figure 7:
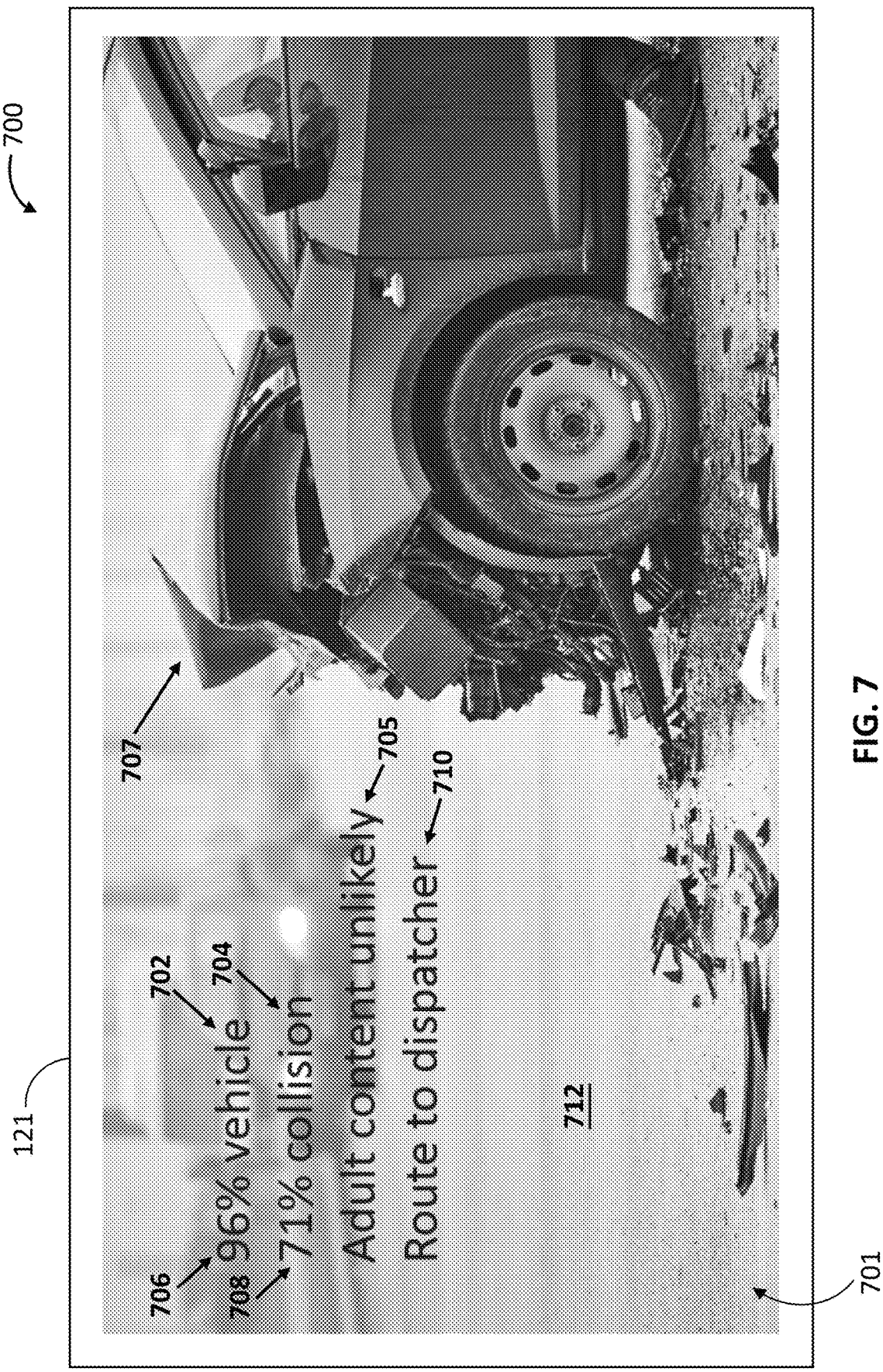
FIG. 7 depicts a window with a photo and returned artificial intelligence (AI) filter results for use with the system of FIG. 1 and the method of FIG. 3, according to an example embodiment.

In the event multimedia content such as a picture is received, the system 108 is able to utilize AI implemented on the picture to determine the likelihood of content and factors such as violence or adult content. The NLP engine (e.g., component 115), similarly to language, will determine any specific matches in content or intent. For instance, an incoming picture which includes violent content or nudity may be routed to a police detective or contact center 102 supervisor. The content provided by this AI matching also includes the likelihood of the match defined by a series of potential matches and percentages (e.g., confidence level(s)). As an example, if the match shows a damaged vehicle 707 of a specific description, it may be routed to a supervisor examining a potential hit and run vehicle incident. FIG. 7 shows the picture 701 and the potential matches (702, 704, 705), and associated match likelihood probabilities as percentages (706, 708), along with the policy 710 to be applied (e.g., for the applying 308 step of method 300).

Location Policy Learning

In addition to having the system 108 administrator create a location policy, the system 108 may use machine learning to determine, based upon location intensity, the policy which should be invoked. Intensity may be defined by the number of requests in a specific area, and the policy may be invoked when a threshold intensity specified by the administrator is reached. For instance, 5 calls within 0.25 square miles would invoke a policy. The administrator may test the policy in a simulated mode before committing it live to production.

Sample algorithmic code is provided below for a similar example:

| Variables: |
| --- |
| m[i] = location coordinates of each incoming messaging session<br>n = number of active messaging sessions for jurisdiction<br>d[j,k] = distance between two messages<br>$W_{max}$ = maximum width of emergency center jurisdictional area<br>$L_{max}$ = maximum length of emergency center jurisdictional area<br>x = horizontal coordinate<br>y = vertical coordinate<br>$thr_{per}$ = seed and learned value of threshold percentage, set at 10%<br>$D1_x$ = horizontal threshold distance between two messages = $W_{max}$ * $thr_{per}$<br>$D1_y$ = lateral threshold distance between two messages = $L_{max}$ * $thr_{per}$<br>$D_{off}$ = additional offset for new messaging session, set at 25%<br>$Dpolyoff_x$ = horizontal polygon offset from messages<br>$Dpolyoff_y$ = vertical polygon offset from messages<br>Function:<br>if new messaging session received<br>  if n = 0, 1 do nothing<br>  if n = 2<br>    if $d_x[1,2] < D1_x$ or $d_y[1,2] < D1_y$, create new policy with shape defined by outermost points + $Dolyoff_{x,y}$<br>  endif |

| Variables: |
| --- |
| if n => 3 and m[i] does not match current policies<br>  if there is a current policy, and m[i] is < $D_{off}$ + m[1..(i−1)],<br>  update policy<br>  if $d_x[1,2] < D1_x$ or $d_y[1,2] < D1_y$, create new policy with shape defined by outermost points + $Dolyoff_{x,y}$<br>  endif<br>endif |

Routing

Once a policy is invoked, the request for service may be routed to a single call taker position, to a special queue where it may be received by a special call taker such as one with medical training, or to an external agency. An example of an external agency is the Coast Guard during a hurricane. A request for service may arrive from a UE 106 with the phrase "water rescue" and may be routed to the Coast Guard command center or water rescue team. Once routed, a call taker or dispatcher with the agency will directly respond and dispatch services.

In addition to routing a policy to a single special workstation, it may be routed to an existing or new group of workstations that may include a queue. This grouping may be created on demand or predefined and includes a series of positions, which may have overflow or secondary policies.

The request may be routed using standard telephony ACD routing or forwarding practices, via API such as ReST or JSON, or even email, non-exclusively. For instance, displaying or otherwise providing the request on a one-time authenticated web portal may be leveraged in an emergency scenario. The external agency 128 may be notified of the request via a phone call and/or by using such systems and methods as those described in U.S. Pat. No. 9,386,407, which is incorporated herein in its entirety, to provide a link to a web page with the information. Once the request has received a response, is terminated by either party, or expires, the page would no longer be available.

NLP Triage Protocol

Another form of NLP policy is one that collects additional data and routes it according to the rules. An example is a water rescue example shown in the sample dialogue below. This is an example of how system 108 and/or method 300 could have been beneficially leveraged during rescue operations similar to Hurricane Harvey.

Text: "water rescue" [incoming NLP match]
System: "Are you on the roof or near land?"
Text: "by my front door"
System: "How many people need rescue?"
Text: 4
System: "Provide your address including any apartment #"
Text: "456 Main St., Chicago"
System: "Wait for confirmation from Fire Department for dispatch. Move to higher ground if water rises. If you no longer need assistance, please reply CANCEL"

Figure 8:
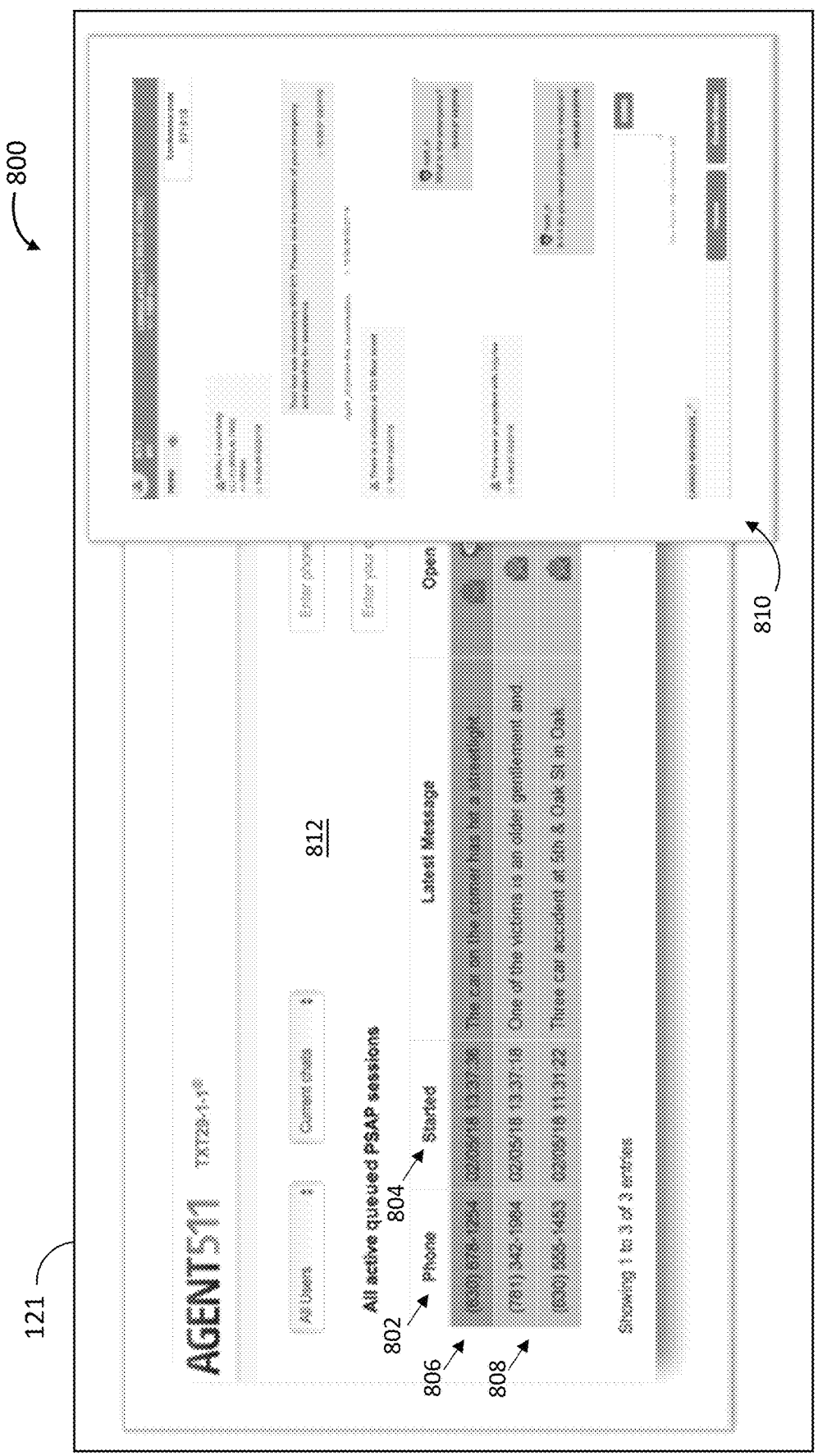
FIG. 8 depicts a session manager window for use with the system of FIG. 1 and the method of FIG. 3, according to an example embodiment.

Once the data is collected and a confirmation message is sent to the UE 106, it would be forwarded to the applicable agency matching the policy. New requests for service are viewable to system 108 users on the display device(s) 121 in a session manager window 800, as shown in FIG. 8. A table 802 includes a source identifier 802 (e.g. phone number), date/time 804, and most recent message 806 above prior messages 808. The session manager window 800 may also include the map 602 shown FIGS. 6A and 6B, where the call taker may select the incoming requests for service.

When the recipient receives the request, the UE 106 may be sent a confirmation message. Thereafter, the dispatcher is able to communication with the User using the same channel for which communications were originally received or another used by the agency. The session manager window 800 includes a chat pop-out window 810 which provides this functionality. User(s) 166 and/or 168 (e.g., the system 108 administrator at his/her administrator workstation 120) may view and/or otherwise interact with (e.g., save message(s) 806 and/or 808 to system 108 memory and/or email them elsewhere) session manager window 800 using a GUI 812 provided on the display device 121.

AI and Learning

The system 108 is able to learn from steps that are automated by the supervisor. As an example, if the supervisor selects a proximity (center and radius) for custom routing all calls that may be associated with an accident, the system 108 learns to do this automatically by determining the location density of text calls and calculating the likely center point. It would then notify the center and one position would start receiving text calls, based upon call taker specializations or skills. Another form of learning is the NLP processing, actions taken by the system, and call takers and improving the workflow. Additionally, system administrators can manually improve the system by creating new tags for message content and associating them with routes. In practice, even automations should be subject to the approval of system administrators under certain circumstances.

Platform Technologies

The system 108 platform may be hosted or on premise and may be deployed as a single computer and database or a high-availability cluster over computer servers, databases, load balancers, and session border controllers. The database technology may be MySQL, SQL, MSSQL, or R3 or Hadoop, non-exclusively. The computer language may be Java/J2EE, C++, PHP, PERL, or other languages, including scripting languages, non-exclusively. Web pages may be secured and transported with HTTPS or virtual private networks or private circuits.

List of Process Actions

The following table provides a listing of example process actions for system 108 implemented in a TEXTBLUE™ software program product.

| Any user role with the session manager will be shown the "map" button. |
|---|
| 1. Once the interactive map button is selected:<br>2. A map will appear depicting the area with the largest concentration of call volume within the PSAP's jurisdictional area. The user may zoom in and out of the map. If calls are distributed across the jurisdictional area, the map will show the entire area.<br>3. The map will display all active calls as map points. Answered calls will be displayed on the point in color#1 and queued call map points will be displayed in color#2. Custom Routed map points will be displayed in color #3. The colors are selectable on a per PSAP-basis, however, should include defaults, blue, orange, and red. The point is a custom graphic (such as a mobile phone). Hovering on a point should show the mobile directory number (MDN), date/time of the call, latitude/longitude/accuracy, and the first mobile originated (MO) message from the user.<br>4. The map will show an algorithmically calculated polygon shape that represents the call concentration with any offsets defined by the supervisor or a standard configuration (expand polygon by 0.5 miles). The polygon will show its name inside, left justified, in the top left corner. If the polygon was automatically created the polygon is named "Shape [1, 2, 3..]" sequentially. If there is no concentration of points to create a polygon, none will be shown. If the user manually drew a polygon, that is displayed in the map along with its name.<br>5. If the user logged into the session manager admin/supervisor, he/she is able to edit and move the shape. He/she may name the shape and click "Apply" in a button on the map and it will become a map to which location-based calls will be routed. The TEXTBLUE (text session application) home screen includes a new button labeled "CUSTOM ROUTING" "Policy routing of text calls." This button will be available only to specific roles (e.g. supervisor) and that role may be available to only authorized PSAP's.<br>1. Once the new Custom Routing button is selected, the user is directed to a new TEXTBLUE page with a tabular list of policies and a button labeled, "Add Policy." The tabular list of policies will display policy name, type of policy, start/stop time, phrase (if applicable), and # of calls currently impacted by policy<br>By selecting "Add Policy," the user will be provided a dialogue box (similar to Add User).<br>1. The policy dialogue box will include a pull-down menu that defines the type of policy (e.g., "Phrase" and "Shape"). Others may be added as needed or desired.<br>2. If the user selects Shape, a map with current calls (similar to map in session manager) will appear. Whether a shape exists which is editable, or if the user wishes to add a shape, he/she may do so. The user may also add a name for the shape and any offset (make it larger or smaller by this offset, along with undo). Edits to the shape occur immediately on screen. Once the user approves the shape, he/she selects "Accept." If the policy already exists, the policy is updated; otherwise, additional detail is required, and the user is so prompted.<br>3. A box with a pull-down showing active call takers will be shown. The user may select the call taker to which messages meeting this policy will be routed. Only active call takers are to be shown. If the call taker logs out after the text call has been routed to the call taker, the text call is returned to the normal queue as a new call. If the call taker does not answer the new text call in a specified amount of time (per standard answer/expiration policies), the standard process is followed (terminate). |

| |
|---|
| Any user role with the session manager will be shown the "map" button. |

4. The dialogue box will add a field labeled "Send Autoreply". The accompanying data entry field can contain between 0 and 160 characters (character types limited by current SMS). If the field is empty no message is sent.
5. The dialogue box will include a start time held labeled "Start Time." The default start time will be the current time in military format (HH:MM:SS). This field is mandatory. Directly next to the "Start Time" will be a field labeled "Now". The accompanying data entry field can accept a blank or checkmark. A checkmark is created via a click/enter. If a checkmark, the "Start Time" will be immediate regardless of the time entered into the "Start Time" field.
6. The dialogue box will include a stop time field labeled "Stop Time." The stop time accepts the current time in military format (HH:MM:SS). Directly next to the "Stop Time" will be a field labeled "Ongoing". "Ongoing" is defined as having no specific stop time. The accompanying data entry field can accept a blank or checkmark. A checkmark is created via a click/enter. If a checkmark, the "Stop Time" must be blank. Once the "Stop Time" is populated the "Ongoing" data entry field should be grayed out to not accept a value.
7. If the user selects the pull-down in #1 for "Phrase," a field will be shown, "Phrase," with the ability to enter up to 50 alphanumeric characters.
8. TEXTBLUE will add a button at the bottom right of the page labeled "Cancel". If chosen the dropdown will disappear and the user will return to the Interactive Map if "Custom Routing" has not been applied. If "Custom Routing" is currently active, choosing the "Cancel" button will show a popup warning, "Are you sure you want to cancel the custom routing currently in place?" A "Yes" or "No" button will be part of the warning. If yes, then custom routing is canceled and calls will be returned to the standard queue. If No, "Custom Routing" will remain in place until it is canceled or a "Stop Time" triggers the end of "'Custom Routing".
9. The dialog box will provide a button to "Enable" policy. There should also be a button to "Disable" policy.
If a required field is not supplied, the user will be notified in red on the dialogue box that information is missing.
TEXTBLUE will create 1 additional queue to accept calls when custom routing is applied.
When a new text call arrives, the policies are checked. If a currently active policy (within start/end time) is invoked that meets the rules, the text call is routed to the applicable position. The bounce back is sent to the mobile phone.
If a new textcall arrives that meets the conditions of an active policy, however, the position is not logged in, the call will go to the normal queue.
If a new text call arrives that meets the conditions of an active policy and the user is logged in, the user will be notified via the PSAP standard process (sound, phone call, display, API call). If the user logs out during an active call, the text call that met the policy is inserted back into the queue as a normal call.
If a policy is changed during a text call such that a text call that met the policy no longer meets the policy and the text call has not been answered, the text call should be routed back to the normal queue with the applicable notification.
If the shape is changed during a text call such that a text call that already exists and did not meet the policy before (or there was no policy), and it now meets the policy, if it has not been answered, apply the policy and send the autoreply.
Once the policy is ended, any active calls that met the policy and have not been answered are returned to the normal queue and sent the autoreply.
If a text call is routed according to a policy, has not been answered and submits the MO, "exit," the text call exits the policy and returns to the normal queue.

Process 200 actions including, without limitation, those listed in the table above, may be accomplished and/or otherwise facilitated in method 300 using system 108 through various user interfaces such as those described above with reference to FIGS. 5-8. As shown in FIG. 4, from the main dashboard 400, user(s) 164 and/or 166 (e.g., administrator using administrator workstation 120) may interact with system 108 using a GUI 412 presented on the display device 121. In addition to the above described custom routing features 402, GUI 412 provides a canned messages feature 404 for the administrator to access stored canned messages for use in method 300 and the ability to edit them. GUI 412 also provides a text chat feature 406 for the administrator to join and/or view chat sessions (e.g., by and between contact center 102, UE(s) 106, and/or service provider(s) 140). The administrator may also use the text chat feature 406 of the main dashboard 400 GUI 412 to manage preferences for text chat sessions. GUI 412 further provides an add/edit users feature 408 with which the administrator may add or edit a user or supervisor profile stored in a memory device of system 108. GUI 412 also provides a reports feature 410 for the administrator to view a report listing of messages by and between contact center 102, UE(s) 106, and/or service provider(s) 140. In some embodiments, GUI 412-facilitated user interactions by user(s) 164 and/or 166, such as those described above with reference to FIG. 4, cause system 108 processor(s) to implement and/or otherwise facilitate various actions in system 108 for method 300 via process 200 block 214, as shown in FIG. 2.

As shown in FIG. 5, from the workflow page 500 for implementing the custom routing features 402, user(s) 164 and/or 166 (e.g., administrator using administrator workstation 120) may interact with system 108 using a GUI 512 presented on the display device 121. In addition to the above-described custom routing features 402, GUI 512 provides a selection window 501. The selection window 501 includes a first drop down bar 502 for the administrator to select whether the policy being defined will be active (e.g., for use presently) or inactive (e.g., for later use). The selection window 501 also includes a second drop down bar 504 for the administrator to select what type of policy definition is being defined. In the example shown in FIG. 5, "Circle" is selected for a location-based policy, which may correspond to the administrator created a group of UE 106 locations defined by encircling them in a circle drawn on the map 602, substantially as described above with reference to FIGS. 6A and 6B. Alternatively, the second drop down bar 504 may enable the administrator to select an NLP-based policy to be defined.

The selection window 501 further includes a third drop down bar 506 for the administrator to select the destination service provider 140 (e.g., denoted by an alphanumeric indicator "CT8343", or, alternatively, by a textual descriptor like "MAUI FIRE DEPARTMENT") for the policy being defined. This destination selection that is input by the administrator using the third drop down bar 506 will direct the processor(s) of system 108 as to where the second message is to be transmitted 310 in the method 300. The third drop down bar 506 may include a set of two drop down bars: one for new calls, and one for current calls, as shown in FIG. 5. The selection window 501 further includes a fourth drop down bar 508 for the administrator to specify whether (and/or which) an autoreply message (e.g., a canned message) is to be sent by system 108 to UE(s) 106 under various circumstances in method 300, and as described above with reference to FIGS. 1-3. The selection window 501 further includes a pair of fifth drop down bars 510 for the administrator to further define the policy based upon start and end times as, for example, described above with reference to FIGS. 1-3. In some embodiments, GUI 512-facilitated user interactions by user(s) 164 and/or 166, such as those described above with reference to FIG. 5, cause system 108 processor(s) to implement and/or otherwise facilitate various actions in system 108 for method 300 via process 200 block 214, as shown in FIG. 2.

As shown in FIGS. 6A and 6B, from overlays 600 and/or 612, user(s) 164 and/or 166 (e.g., administrator using administrator workstation 120) may interact with system 108 using GUIs 612 and/or 634 presented on the display device 121. As shown in FIG. 6B, to enable and/or otherwise facilitate the administrator defining policies (e.g., custom policies), the GUI 634, for instance, includes first 618, second 620, and third 622 drop down bars providing analogous functionality to the system 108 administrator as described above with reference to the first 502, second 504, and third 506 drop down bars of FIG. 5. The third drop down bar 622 may include a set of two drop down bars: one for new calls, and one for current calls, as shown in FIG. 6B. The GUI 634 also includes a first text entry box 624 for the administrator to type in an autoreply message to be sent to the UE 106, for example in response to receiving 302 the first message therefrom. Alternatively, a current selection for a canned message is displayed on GUI 634 in the first text entry box 624, and the system 108 administrator may edit that canned message directly using input devices like the mouse and the keyboard. As shown in FIG. 6B, the administrator may alternately check and uncheck a first check box 625 to alternately enable and disable, respectively, this autoreply functionality of system 108 in the method 300. The GUI 634 further includes second 626 and third 628 text entry boxes for the administrator to type in start and end times, respectively, for the policy being defined, similarly to the functionality provided to the system 108 administrator by the pair of fifth drop down bars 510 in FIG. 5. Second 630 and third 632 check boxes are provided on GUI 634 for the administrator to alternately check and uncheck to respectively enable and disable the defined start and end times for the policy. In some embodiments, GUI (612 and/or 634)-facilitated user interactions by user(s) 164 and/or 166, such as those described above with reference to FIGS. 6A and 6B, cause system 108 processor(s) to implement and/or otherwise facilitate various actions in system 108 for method 300 via process 200 block 214, as shown in FIG. 2.

Figure 9:
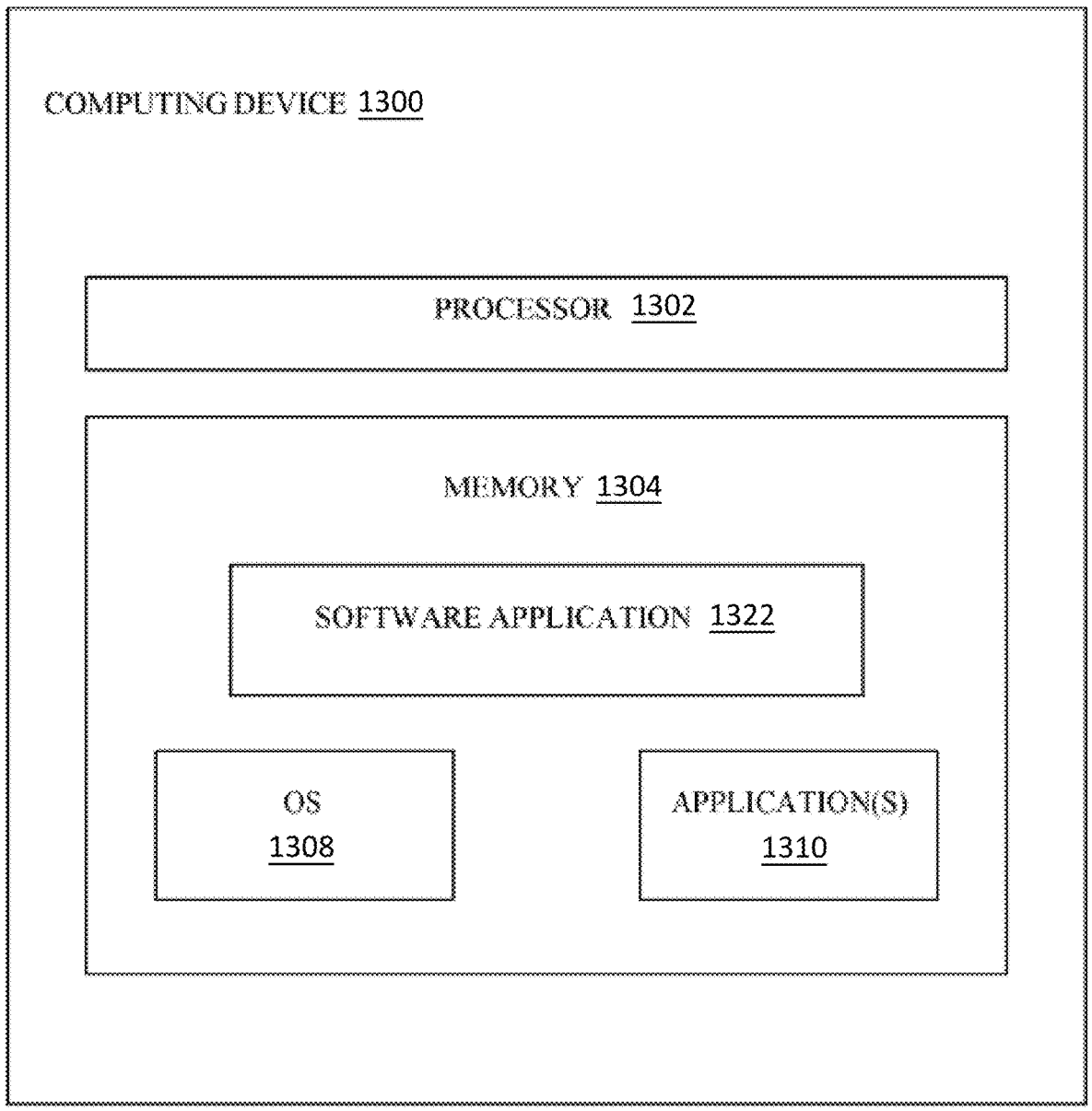
FIG. 9 is a block diagram of the arrangement of components of a computing device including functionality for querying one or more databases, according to an example embodiment.

FIG. 9 is a block diagram of the arrangement of components of an example computing device 1300, according to an example embodiment, which may be used for implementing any or all of the above-described systems (e.g., 100 and/or 108) and methods (e.g., 300). The example computing device 1300 shown in FIG. 9 may comprise the UE 106, the ESRP server 112, and/or the CPE 114 of the contact center 102. As shown, computing device 1300 includes a processor 1302 and memory 1304, among other components (not shown).

The memory 1304 includes various applications that are executed by processor 1302, including installed applications 1310, an operating system 1308, and software application 1322. In embodiments where the computing device 1300 comprises the CPE 114, the software application 1322 comprises a non-voice communication application. In embodiments where the computing device 1300 comprises the ESRP server 112, the software application 1322 comprises a software application configured to send and receive messages between a UE 106 and the contact center 102.

Figure 10:
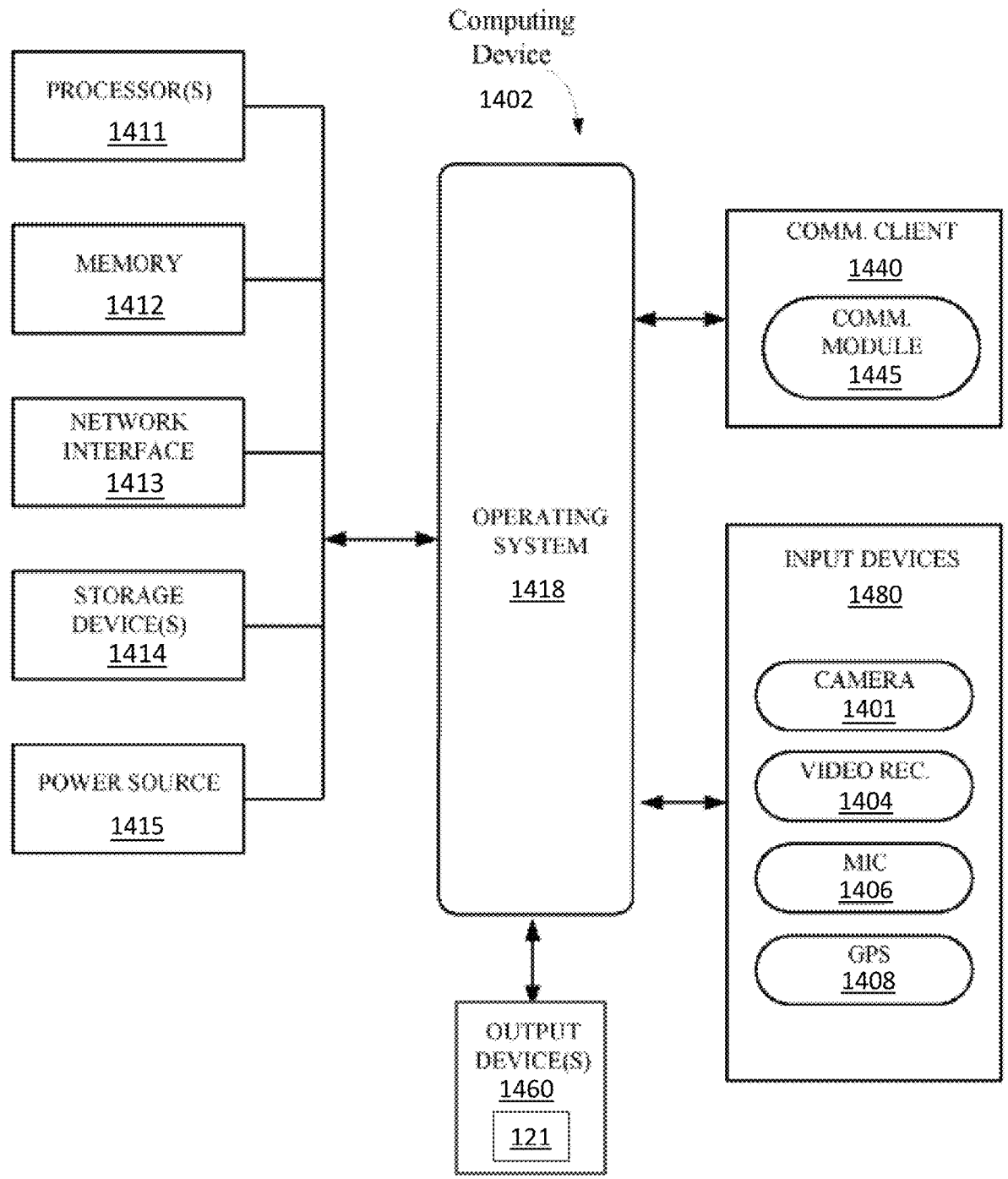
FIG. 10 is a block diagram of example functional components for a computing device, according to one embodiment.

FIG. 10 is a block diagram of example functional components for a computing device 1402, according to one embodiment, which may be used for implementing any or all of the above-described systems (e.g., 100 and/or 108) and methods (e.g., 300). The example computing device 1402 shown in FIG. 10 may comprise the UE 106, the ESRP server 112, and/or the CPE 114 of the contact center 102. One particular example of computing device 1402 is illustrated. Many other embodiments of the computing device 1402 may be used.

In the illustrated embodiment of FIG. 10, the computing device 1402 includes one or more processor(s) 1411, memory 1412, a network interface 1413, one or more storage devices 1414, a power source 1415, output device(s) 1460, and input device(s) 1480. The computing device 1402 also includes an operating system 1418 and a communications client 1440 that are executable by the computing device 1402. Each of components 1411, 1412, 1413, 1414, 1415, 1460, 1480, 1418, and 1440 is interconnected physically, communicatively, and/or operatively for inter-component communications in any operative manner.

As illustrated, processor(s) 1411 are configured to implement functionality and/or process instructions for execution within computing device 1402. For example, processor(s) 1411 execute instructions stored in memory 1412 or instructions stored on storage devices 1414. Memory 1412, which may be a non-transient, computer-readable storage medium, is configured to store information within computing device 1402 during operation. In some embodiments, memory 1412 includes a temporary memory, area for information not to be maintained when the computing device 1402 is turned OFF. Examples of such temporary memory include volatile memories such as random access memories (RAM), dynamic random access memories (DRAM), and static random access memories (SRAM). Memory 1412 maintains program instructions for execution by the processor(s) 1411.

Storage devices 1414 also include one or more non-transient computer-readable storage media. Storage devices 1414 are generally configured to store larger amounts of information than memory 1412. Storage devices 1414 may further be configured for long-term storage of information. In some examples, storage devices 1414 include non-volatile storage elements. Non-limiting examples of non-volatile storage elements include magnetic hard disks, optical discs, floppy discs, flash memories, or forms of electrically programmable memories (EPROM) or electrically erasable and programmable (EEPROM) memories.

The computing device 1402 uses network interface 1413 to communicate with external devices via one or more networks. Network interface 1413 may be a network interface card, such as an Ethernet card, an optical transceiver, a radio frequency transceiver, or any other type of device that can send and receive information. Other non-limiting examples of network interfaces include cellular network interface, wireless network interface, Bluetooth®, 3G and WiFi® radios in mobile computing devices, and USB (Universal Serial Bus), among others. In some embodiments, the computing device 1402 uses network interface 1413 to wirelessly communicate with an external device, a mobile phone of another, or other networked computing device.

The computing device 1402 includes one or more input devices 1480. Input devices 1480 are configured to receive input from a user through tactile, audio, video, or other sensing feedback. Non-limiting examples of input devices 1480 include a presence-sensitive screen, a mouse, a keyboard, a voice responsive system, camera 1401, a video recorder 1404, a microphone 1406, a GPS module 1408, or any other type of device for detecting a command from a user or sensing the environment. In some examples, a presence-sensitive screen includes a touch-sensitive screen.

One or more output devices 1460 are also included in computing device 1402. Output devices 1460 are configured to provide output to a user using tactile, audio, and/or video stimuli. Output devices 1460 may include a display screen (part of the presence-sensitive screen), a sound card, a video graphics adapter card, or any other type of device for converting a signal into an appropriate form understandable to humans or machines. Additional examples of output device 1460 include a speaker, a cathode ray tube (CRT) monitor, a liquid crystal display (LCD), or any other type of device that can generate intelligible output to a user. In some embodiments, a device may act as both an input device and an output device.

The computing device 1402 includes one or more power sources 1415 to provide power to the computing device 1402. Non-limiting examples of power source 1415 include single-use power sources, rechargeable power sources, and/or power sources developed from nickel-cadmium, lithium-ion, or other suitable material.

The computing device 1402 includes an operating system 1418. The operating system 1418 is software stored in a memory and executed by a processor. The operating system 1418 controls operations of the components of the computing device 1402. For example, the operating system 1418 facilitates the interaction of communications client 1440 with processors 1411, memory 1412, network interface 1413, storage device(s) 1414, input device(s) 1480, output device(s) 1460, and power source 1415.

As also illustrated in FIG. 10, the computing device 1402 includes communications client 1440. Communications client 1440 includes communications module 1445. Each of communications client 1440 and communications module 1445 includes program instructions and/or data that are executable by the computing device 1402. For example, in one embodiment, communications module 1445 includes instructions causing the communications client 1440 executing on the computing device 1402 to perform one or more of the operations and actions described in the present disclosure. In some embodiments, communications client 1440 and/or communications module 1445 form a part of operating system 1418 executing on the computing device 1402.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to retrieve content (i.e., recorded voicemails) from a content server (i.e., a voicemail server). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as, for example, to a city, ZIP code, or state level), so that a particular location of a user cannot be determined. Thus, the user may have control over how information is collected about him or her and used by the systems discussed herein.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the invention unless otherwise claimed. No language in the specification should be construed as indicating any non-claimed element as essential to the practice of the invention.

One or more embodiments of the disclosure may be implemented as a computer program product for use with a computer system. The program(s) of the computer program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Variations of the embodiments disclosed herein may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

I claim:

1. A computer-implemented method for routing of communications sessions with a contact center, comprising:
   receiving, by a system, a first message from a user equipment (UE) via a first communications protocol;
   parsing, by the system, content of the first message using unsupervised machine learning to determine whether the first message comprises pertinent data indicating a request for services;
   in response to the first message comprising the pertinent data, applying, by the system, a policy for routing the first message to a service provider based on the parsed content of the first message;
   transmitting, by the system, a second message to the service provider according to the applied policy via a second communications protocol, wherein the second message comprises at least a portion of the pertinent data;
   receiving, by the system, feedback based on an accuracy of parsing the content of the first message using the unsupervised machine learning; and
   based on comparing the accuracy to an accuracy threshold, using, by the system, supervised machine learning to parse content of a next message received by the system.

2. The computer-implemented method according to claim 1, wherein:
   the policy indicates routing of the first message to a plurality of service providers;
   wherein applying the policy for routing the first message to the service provider comprises prioritizing, based on the pertinent data, a first service provider of the plurality of service providers over a second service provider of the plurality of service providers for routing the first message; and
   transmitting the second message to the service provider comprises transmitting the second message to the first service provider prior to transmitting the second message to the second service provider.

3. The computer-implemented method according to claim 1 further comprising receiving a policy definition from a first user associated with at least one of: the contact center, and the service provider, wherein applying the policy for routing the first message to the service provider comprises applying the policy according to the received policy definition.

4. The computer-implemented method according to claim 3, wherein the first message includes a plurality of first messages received from a plurality of UEs, wherein each of the plurality of first messages includes a UE location from whence each of the plurality of UEs sent the first message to the contact center, and wherein:
   the policy definition includes a location intensity defined as a number of the plurality of first messages received:
      from a predetermined geospatial area or a predetermined range of geospatial areas; and
      within a predetermined amount of time; and
   applying the policy for routing the first message to the service provider comprises routing the at least two of the plurality of first messages to the service provider further according to the location intensity.

5. The computer-implemented method according to claim 4, wherein:
   the method further comprises determining, based on at least one of: the location intensity, the UE locations, and the pertinent data, that at least two of the plurality of first messages pertain to a single service request category; and
   transmitting the second message to the service provider comprises transmitting the second message to one or more service providers coordinating or providing services for the single service request category.

6. The computer-implemented method according to claim 1, wherein using the supervised machine learning to parse the content of the next message comprises:
   receiving the next message; and
   parsing the content of the next message using supervised machine learning based on comparing the accuracy of parsing the content of the first message to the accuracy threshold.

7. The computer-implemented method according to claim 1, wherein the method further comprises:
   receiving a previous message, wherein the previous message is received prior to receiving the first message; and
   parsing content of the previous message using supervised machine learning,
   wherein using the supervised machine learning to parse the content of the next message comprises returning to using the supervised machine learning to parse the content of the next message based on comparing the accuracy to the accuracy threshold.

8. The computer-implemented method according to claim 1, wherein applying the policy for routing the first message is based on using unsupervised machine learning.

9. The computer-implemented method according to claim 1, wherein the method further comprises:
   receiving second feedback based on an accuracy of applying the policy for routing the first message using supervised machine learning;
   receiving a second message;
   parsing content of the second message to determine whether the second message comprises the pertinent data indicating a request for services; and
   in response to the second message comprising the pertinent data, applying the policy for routing the second message based on comparing the accuracy of applying the policy for routing the first message with a second accuracy threshold.

10. The computer-implemented method according to claim 1, wherein the request for services indicates a particular type of service, and wherein the accuracy threshold is associated with the particular type of service.

11. A system for routing of communications sessions with a contact center, comprising:
one or more processors; and
a non-transitory computer-readable medium having processor-executable instructions stored thereon, wherein the processor-executable instructions, when executed by the one or more processors, facilitate:
receiving a first message from a user equipment (UE) via a first communications protocol;
parsing content of the first message using unsupervised machine learning to determine whether the first message comprises pertinent data indicating a request for services;
in response to the first message comprising the pertinent data, applying a policy for routing the first message to a service provider based on the parsed content of the first message;
transmitting a second message to the service provider according to the applied policy via a second communications protocol, wherein the second message comprises at least a portion of the pertinent data;
receiving feedback based on an accuracy of parsing the content of the first message using the unsupervised machine learning; and
based on comparing the accuracy to an accuracy threshold, using supervised machine learning to parse content of a next message received by the system.

12. The system according to claim 11, wherein:
the one or more processors are further configured to execute the instructions in order to determine, based on the data extracted in the parsing step, that the first message contains the pertinent data;
the first message is or includes multimedia content; and
determining that the first message contains the pertinent data comprises:
forwarding at least a portion of the multimedia content of the first message to a multimedia content knowledgebase for matching one or more multimedia features in the multimedia content knowledgebase to corresponding one or more multimedia features of the at least a portion of the multimedia content of the first message; and
receiving at least one of: one or more match types, and one or more match intents, from the multimedia content knowledgebase for use in one or more of the parsing, applying, and transmitting steps of the method.

13. The system according to claim 12, wherein:
the multimedia content of the first message includes viewer- or listener-sensitive content;
to forward the at least a portion of the multimedia content of the first message to the multimedia content knowledgebase, the one or processors are further configured to execute the instructions in order to:
forward the at least a portion of the multimedia content of the first message to the multimedia content knowledgebase for matching one or more viewer- or listener-sensitive multimedia features in the multimedia content knowledgebase to corresponding one or more viewer- or listener-sensitive multimedia features of the at least a portion of the multimedia content of the first message; and
to receive the at least one of: one or more match types, and one or more match intents, from the multimedia content knowledgebase, the one or more processors are further configured to execute the instructions in order to:
receive one or more viewer- or listener-sensitive content match categories from the multimedia content knowledgebase for use by the one or more processors in one or more of the parsing, applying, and transmitting steps of the method.

14. The system according to claim 11, wherein the processor-executable instructions, when executed by the one or more processors, further facilitate:
based on the pertinent data, determining that the first message lacks additional data for service coordination or provision by the contact center;
transmitting a request message to the UE to provide the additional data; and
in response to receiving the additional data, transmit transmitting the additional data to the service provider.

15. The system according to claim 11, wherein to the processor-executable instructions, when executed by the one or more processors, further facilitate:
receiving a policy definition from a first user, wherein applying the policy for routing the first message to the service provider is based on the received policy definition.

16. The system according to claim 15, further comprising:
a display device in communication with the one or more processes, wherein:
the first message includes a plurality of first messages received from a plurality of UEs;
each of the plurality of first messages includes a UE location from whence each of the plurality of UEs sent the first message to the contact center; and
the one or more processors are further configured to execute the instructions to plot the UE location for each of the plurality of first messages on a map for display to at least one of: the first user, and at least a second user associated with at least one of: the contact center, and the service provider, via the display device.

17. The system according to claim 16, wherein:
to receive the policy definition, the one or more processors are further configured to execute the instructions to receive, via interaction with the displayed map by at least one of: the first user, and the at least a second user, a grouping of at least two UE locations on the map, wherein the grouping corresponds to at least two of the plurality of first messages pertaining to a single service request category; and
to apply the policy for routing the first message to the service provider, the one or more processors are further configured to route the at least two of the plurality of first messages to the service provider further according to the received grouping.

18. The system according to claim 15, wherein the policy definition comprises the accuracy threshold indicating a minimum acceptable accuracy for the unsupervised machine learning.

19. A non-transitory computer-readable storage medium storing program instructions for routing of communications sessions with a contact center, which, when executed by one or more processors, cause the one or more processors to:
receive a first message from a user equipment (UE) via a first communications protocol;
parse content of the first message using unsupervised machine learning to determine whether the first message comprises pertinent data indicating a request for services;

in response to the first message comprising the pertinent data, apply a policy for routing the first message to a service provider based on the parsed content of the first message;

transmit a second message to the service provider according to the applied policy via a second communications protocol, wherein the second message comprises at least a portion of the pertinent data;

receive feedback based on an accuracy of parsing the content of the first message using the unsupervised machine learning; and based on comparing the accuracy to an accuracy threshold, using supervised machine learning to parse content of a next message received by the system.

20. The non-transitory computer-readable storage medium according to claim 19, wherein:

the first message comprises a UE location from which the UE sent the first message;

to apply the policy for routing the first message to the service provider, the program instructions further cause the one or more processors to determine at least one of: a nearest service provider location, and a most appropriate service provider location, based on the UE location; and to transmit the second message to the service provider, the program instructions further cause the one or more processors to transmit the second message to at least one of: the determined nearest service provider location, and the determined most appropriate service provider location.

* * * * *